US006521137B2

(12) United States Patent
Kubota et al.

(10) Patent No.: US 6,521,137 B2
(45) Date of Patent: Feb. 18, 2003

(54) METHOD FOR MANUFACTURING LIQUID DISCHARGE HEAD

(75) Inventors: Masahiko Kubota, Tokyo (JP); Masanori Takenouchi, Yokohama (JP); Kiyomitsu Kudo, Kawasaki (JP); Ryoji Inoue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 09/780,395

(22) Filed: Feb. 12, 2001

(65) Prior Publication Data

US 2001/0043255 A1 Nov. 22, 2001

(30) Foreign Application Priority Data

Feb. 15, 2000 (JP) ....................................... 2000-037151
Jan. 30, 2001 (JP) ....................................... 2001-021510

(51) Int. Cl.[7] ................................................ G01D 15/00
(52) U.S. Cl. ....................................... 216/27; 29/890.01
(58) Field of Search .......................... 216/27; 29/890.01

(56) References Cited

U.S. PATENT DOCUMENTS

| | | | | |
|---|---|---|---|---|
| 4,536,250 A | * | 8/1985 | Ikeda et al. | 156/651 |
| 4,723,129 A | | 2/1988 | Endo et al. | 346/1.1 |
| 5,278,585 A | | 1/1994 | Karz et al. | 346/140 |
| 5,897,789 A | * | 4/1999 | Weber | 216/27 |
| 6,004,473 A | * | 12/1999 | Hsaio et al. | 216/22 |
| 6,110,393 A | * | 8/2000 | Simmons et al. | 216/36 |
| 6,180,427 B1 | * | 1/2001 | Silverbrook | 438/21 |
| 6,264,849 B1 | * | 7/2001 | Silverbrook | 216/27 |
| 6,294,101 B1 | * | 9/2001 | Silverbrook | 216/27 |
| 6,340,222 B1 | * | 1/2002 | Silverbrook | 347/54 |
| 6,426,014 B1 | * | 7/2002 | Silverbrook | 216/27 |

FOREIGN PATENT DOCUMENTS

| | | |
|---|---|---|
| EP | 0 436 047 A1 | 7/1991 |
| EP | 0 721 841 A2 | 7/1996 |
| EP | 0 811 493 A2 | 12/1997 |
| EP | 0 819 528 A2 | 1/1998 |
| EP | 0895861 | 2/1999 |
| EP | 0956954 | 11/1999 |
| EP | 0976562 | 2/2000 |
| JP | 6-31918 2 | 2/1994 |
| JP | 9-48127 3 | 2/1997 |
| JP | 9-3234205 | 12/1997 |
| JP | 10-245884 | 1/1998 |

* cited by examiner

*Primary Examiner*—Gregory Mills
*Assistant Examiner*—Karla Moore
(74) *Attorney, Agent, or Firm*—Fitzpatrick, Cella, Harper & Scinto

(57) ABSTRACT

A first gap formation member and a fixed portion are provided on an element substrate, a movable member is formed on the first gap formation member and the fixing member, and a second gap formation member is formed thereon. The first gap formation member is removed, a wall material is coated and exposed at a pattern mask. The wall material is patterned to form the liquid flow path walls and the liquid supply ports altogether, and removing the second gap formation member, hence making it easier to form the side stopper that supports the movable member stably in a state where the displacement of the movable member is regulated to close the liquid supply port, as well as the minute gap between the movable member and the side stopper in higher precision.

18 Claims, 29 Drawing Sheets

1
4
25
26
29
30

1
4
6
25
26
29
30
31
32
33
34

METHOD FOR MANUFACTURING LIQUID DISCHARGE HEAD

BACKGROUND OF THE INVENTION

1. Field of the Invention

The present invention relates to a method for manufacturing a liquid discharge head that discharges liquid by bubbling it. More particularly, the invention relates to a method for manufacturing a liquid discharge head provided with a movable member which is displaceable by pressure exerted at the time of bubbling.

Also, the present invention is applicable to a printer for recording on a recording medium, such as paper, thread, textile, cloths, leather, metal, plastic, glass, wood, ceramics, and some others, as well as to a copying machine, a facsimile equipment having communication systems, and a word processor having a printer unit, among some others. Further, the invention is applicable to a recording apparatus of industrial use, which is complexly combined with various processing apparatuses.

In this respect, the term "recording" used for the invention hereof means not only the provision of characters, graphics, and other meaningful images, but also, that of patterns and other images which are not meaningful.

2. Related Background Art

For a recording apparatus, such as a printer, there has conventionally been known an ink jet recording method, the so-called bubble jet recording method, in which images are formed on a recording medium by adhesion of ink discharged from discharge ports by action based on the abrupt voluminal changes that follow a bubble created by the application of thermal energy or the like to liquid ink in flow paths. A recording apparatus that uses this bubble jet recording method is generally provided with discharge ports for discharging ink; liquid flow paths communicated with the discharge ports; and electrothermal converting devices arranged in the liquid flow paths as means for generating energy used for discharging ink as disclosed in the specification of U.S. Pat. No. 4,723,129 and others.

In accordance with a recording apparatus and recording method of the kind, it is possible to recording high quality images at a higher speed in a lesser amount of noises. At the same time, the head of this recording apparatus makes it possible to arrange discharge ports for discharging ink in high density with many advantages, such as to facilitate obtaining recorded images in high resolution or color images by use of a smaller apparatus. As a result, the bubble jet recording method has been widely utilized for many office equipment including a printer, a copying machine, and a facsimile equipment, and further, utilized for industrial systems, such as textile printing apparatus, in recent years.

Along with the wider utilization of the bubble jet technologies for products in many fields, various demands have been brought increasingly in recent years as given below.

In order to obtain images in higher quality, there has been proposed a liquid discharging method or the like that regulates driving conditions to attain good ink discharges at high ink discharge speed on the basis of stabilized bubble generation or there has been proposed a liquid discharge head the configuration of flow paths of which is improved to make it possible to perform recording at higher speed, as well as to effectuate refilling liquid into flow paths at higher speed after liquid has been discharged.

Besides, such heads as described above, there is an invention disclosed in the specification of Japanese Patent Application Laid-Open No. 6-31918 in which attention is given to the back wave (pressure directed toward the side opposite to the discharge port) generated along with the creation of a bubble (bubbles), which incurs energy loss at the time of discharges, and a head is structured so as to prevent the back waves from being generated. In accordance with the invention disclosed in the specification of this Laid-Open Application, the back wave can be suppressed momentarily and slightly. However, since nothing is taken into consideration at all as to the correlations between the growth of bubble and the triangle portion, nor there is any conception thereof, this invention contains problems as given below.

In other words, a heat generating element is positioned on the bottom of each recessed portion by the invention disclosed in the specification of this Laid-Open Application, thus making it impossible to provide the linearly communicative condition with each discharge port. As a result, the shape of each liquid droplet is not stabilized, and furthermore, owing to the growth of bubble which is allowed to begin with the circumference of each vertex of the triangle portion, the bubble grows up to the entire side opposite to one side of the plate-like portion of the triangle. As a result, the ordinary growth of bubble is completed in liquid as if there was no plate-like member present. Then, for the bubble that has grown, the existence of the plate-like member has no relational effect at all. On the contrary, with the entire body of the plate-like member being surrounded by bubble, the refilling to the heat generating element positioned on the bottom of the recessed portion creates disturbance in the liquid flow, which causes a micro-bubble to be retained inside the recessed portion, leading to disorder in effectuating the principle of discharges itself, which is based on the growth of bubble.

Meanwhile, as disclosed in the specification of European Patent (EP) Application Laid-Open No. 436,047, it has been proposed to provide a first valve which is arranged between the vicinity of discharge port and bubble generating portion to cut them off, and a second valve which is arranged between the bubble generating unit and ink supply portion to cut them off completely, and then, to open and close these valves alternately (FIG. 4 to FIG. 9, EP Laid-Open Application 436,047). However, it is required by this invention to divide three chambers by two, respectively, which results in the creation of large tail that ink trails when it follows a liquid droplet at the time of discharge. Then, the number of satellite dots becomes much more than that of those formed by the discharge effectuated by the ordinary method in which bubble grows, shrinks, and becomes extinct in that order (presumably, this is because the effect of meniscus retraction that follows bubble extinction cannot be used). Also, at the time of refilling, liquid is supplied to the bubble generating portion along with the extinction of bubble. However, as no liquid can be supplied to the vicinity of discharge port until the next bubbling takes place, not only discharging liquid droplets vary greatly, but also, the response frequency of discharges becomes extremely small. Therefore, this invention has not attained the practical level as yet.

In this respect, the applicant hereof has proposed many inventions that use a movable member (a plate member or the like formed in a cantilever fashion, which is provided with the free end from the pivot thereof on the discharge port side) capable of contributing to the discharge of liquid droplets effectively unlike the conventional art described above. In the specification of Japanese Patent Application Laid-Open No. 9-48127, an invention is disclosed wherein the upper limit of the displacement is regulated for a movable member in order to prevent even a slight disorder from being given to the behavior of the movable member. Also, in the specification of Japanese Patent Application Laid-Open No. 9-323420, an invention is disclosed wherein the refilling capability is enhanced by the advantageous utilization of a movable member by shifting the position of the common liquid chamber to the free end side of the movable member, that is, on the downstream side. For these inventions, there is adapted a mode as a prerequisite in which the growing bubble is encircled by the movable member temporarily, and then, it is released from this stage to the discharge port side all at once. As a result, no attention is given to each individual element of the bubble related to the formation of liquid droplet itself as a whole nor any attention is given to the correlations between them.

In the next stage in this respect, the applicant hereof has disclosed an invention in the specification of Japanese Patent Application Laid-Open No. 10-24588 wherein a part of bubble generating area is released from a movable member with attention given to the bubble growth which is made by the propagation of pressure waves (acoustic waves) as element related to liquid discharge. Nevertheless, in this invention, too, no attention is given to each individual element of the bubble related to the formation of liquid droplet itself as a whole nor any attention is given to the correlations between them.

SUMMARY OF THE INVENTION

Conventionally, although it has been known that the front portion of a bubble created by film boiling exerts a great influence on discharge for the liquid discharge head of edge shooter type (that is, the type having the discharge ports on the front part of flow paths, which do not change liquid flow direction), there has been no invention any attention of which is given to enabling the front portion of the bubble to contribute more effectively to the formation of discharge liquid droplet. Now, therefore, the inventors hereof have ardently studies with a view to solving technical problems related thereto, and given attention further to the displacement of movable member and created bubble. As a result, the inventors hereof have acquired the effective knowledge as given below.

In other words, with the mode of flow path side walls taken into consideration, it is arranged to regulate the displacement of movable member by use of the flow path side walls along with the growth of bubble, and then, a structure is designed in order to regulate the movable member, and at the same time, to regulate the growth of bubble. More specifically, it has been found that with the provision of a stopper for the flow path side walls to be used for the movable member, the mode of growing bubble is regulated, while allowing the required liquid to flow, and that the tolerance range can be made wider for the micro-processing thereof.

In general, the larger the clearance between the movable member that is displaced in the flow path, and the flow path side walls which are positioned on the sides of the movable member, the better for absorbing the variation that may be caused to exist due to manufacture when arranging movable member. However, if this clearance is large, a problem is encountered that bubble enters the gap between the movable member and the flow path side walls positioned on the sides of the movable member by the growth of the bubble, and it grows around the movable member and has grown up to the upper surface thereof. As a result, there is no alternative but this clearance should be made as small as possible eventually. However, with the provision of stopper function for the flow path side walls that are positioned on the sides of movable member with respect to it, the aforesaid incompatible requirements can be met satisfactorily. In other words, even for a structure where the clearance is made large (5 $\mu$m to 8 $\mu$m, for example) to absorb the variation that may be caused due to manufacture when arranging liquid flow paths and movable members, the gap between the movable member and the stopper becomes narrower gradually as the movable member is displaced along with the growth of bubble, and then, the passage of bubble begins to be restricted when the gap becomes approximately 3 $\mu$m. In this way, the passage of bubble is completely blocked on a part of the portion and the circumference thereof where the movable member and the stopper positioned on sides thereof are in contact with each other. In other words, bubble is not allowed to grow around to the upper surface of the movable member.

On the basis of such knowledge as described above, the side stopper is provided. In this case, with the bubble growth from the surface where bubble is created to the upper limit being regulated exactly, the bubble growth in the direction opposite to the discharge port is increased in the space between the movable member and the surface where the bubble is created. This type of bubble growth is not the element that may reduce the discharge efficiency. Therefore, it may be negligible. The inventors hereof, however, have made further studies for the rational utilization thereof for the displacement of movable member. As a result, a knowledge has been acquired to make it possible to utilize the growth of bubble rationally for the displacement of movable member by allowing the movable member to approach the bubble creation surface closely (20 $\mu$m or less, for example), at the same time, forming integrally with the movable member a portion to receive pressure waves which is away from the bubble creation surface. Also, it has been found that the movable member that extends from the fixed end to the free end generates its actual fulcrum between the free end and the fixed end when it moves. As a result of further studies, it has also been found that fluctuation can be corrected by regulating the spatial volumes that essentially follow the movement of movable member.

Now, therefore, it is an object of the present invention to provide a method for manufacturing a liquid discharge head capable of forming the minute gap between movable member and side stopper more easily in higher precision.

The method of the present invention for manufacturing a liquid discharge head, which is provided with a plurality of discharge ports for discharging liquid; a plurality of liquid flow paths, each one end thereof being communicated with each of the discharge ports, having bubble generating area for generating a bubble in liquid; means for generating a bubble to generate energy for creating a bubble to be grown; a plurality of liquid supply ports, each being arranged for each of the plurality of liquid flow paths to be communicated with a common liquid supply chamber; and movable members, each having fixed portion and movable portion supported with gap with the liquid supply port on the liquid flow path side, comprises the steps of forming a first gap formation member on an element substrate having the means for generating a bubble; forming movable member on the first gap formation member and the fixing member on the element substrate; forming a second gap formation member for the formation of gap between the side walls of the liquid flow path and the liquid supply port on the upper surface and sides of the movable portion of the movable member;

removing the first gap formation member, while leaving the second gap formation member intact in the state of being closely in contact with the movable member; forming wall material at least on the second gap formation member and circumference of the movable member; patterning the wall material to form the liquid flow path walls and the liquid supply ports altogether; and removing the second gap formation member. Further, this method for manufacturing a liquid discharge head may be provided with a step bonding the element substrate provided with the bubble generating means, the movable member, the liquid flow path walls, and the liquid supply ports, and the ceiling plate provided with the common liquid supply chamber.

Also, another characteristic of the present invention lies in a method for manufacturing a liquid discharge head provided with a plurality of discharge ports for discharging liquid; a plurality of liquid flow paths, each one end thereof being communicated with each of the discharge ports, having bubble generating area for generating a bubble in liquid; means for generating a bubble to generate energy for creating the bubble to be grown; a plurality of liquid supply ports, each being arranged for each of the plurality of liquid flow paths to be communicated with a common liquid supply chamber; and movable members, each having fixed portion and movable portion supported with gap with the liquid supply port on the liquid flow path side, comprising the steps of forming a first gap formation layer on an element substrate having the means for generating a bubble for the formation of a first gap formation member, and performing patterning; forming the fixing portion of the movable member having the same height as that of the first gap formation member in the portion on the substrate not occupied by the first gap formation member; forming the movable member on the first gap formation member and the fixing member; forming a second gap formation member for the formation of gap between the side walls of the liquid flow path and the liquid supply port on the upper surface and sides of the movable portion of the movable member; removing the first gap formation member, while leaving the second gap formation member intact in the state of being closely in contact with the movable member; forming wall material at least on the second gap formation member and circumference of the movable member; patterning the wall material to form the liquid flow path walls and the liquid supply ports altogether; and removing the second gap formation member. Further, this method for manufacturing a liquid discharge head may be provided with a step bonding the element substrate provided with the bubble generating means, the movable member, the liquid flow path walls, and the liquid supply ports, and the ceiling plate provided with the common liquid supply chamber.

Also, it is preferable for the step of forming the second gap formation member to comprise the steps of forming a second gap formation layer for forming a second gap formation member to cover the movable member; forming a mask layer on the second gap formation layer to form the second gap formation member; etching the second gap formation layer with dry etching process using the mask layer; and forming the second gap formation member by etching the second gap formation layer with wet etching process subsequent to the dry etching process. With the dry etching and wet etching thus executed dividedly in two stages, it becomes possible to form the second gap formation member more easily in higher precision. Further, it is preferable for the step of removing the first gap formation member to be a step of removing altogether the first gap formation member, and the mask layer for forming the second gap formation member with wet etching process. Also, it is preferable for the step of forming the mask layer to be a step of forming a mask layer with one and the same material as the film used for the first gap formation member. In this way, it becomes possible to reduce the number of manufacturing steps and manufacture the liquid discharge head at lower costs.

The material of the first gap formation member is preferably aluminum, Al/Cu, Al/Si, or other aluminum alloy, and the material of the second gap formation member is preferably TiW, W/Si, W, or other tungsten alloy. The tungsten alloy has light shielding capability to be able to function as a mask usable at the time of exposure, and also, while it is resistive to etching solution generally used for removing the Al film pattern or resin that serves as a sacrifice layer or the like, it has an advantage that the etching process becomes selective, because it can be removed by use of a designated etching solution (hydrogen peroxide).

It is preferable for the step of patterning wall material to form the liquid flow path walls and the liquid supply ports by photolithographic process using negative type resist. Further, for the step of patterning wall material, it is preferable that the mask pattern. which is used in the exposure step for the liquid flow path walls and the liquid supply ports, should be provided with a wider projection area of non- photosensitive portion than the projection area of the second gap formation member on the movable member.

With the method thus structured, it becomes easier to form the side stopper that supports the movable member stably in a state where the displacement of the movable member is regulated to close the liquid supply port, and also, it becomes possible to form the minute gap between the movable member and the side stopper more easily in higher precision.

Furthermore, the liquid discharge head, which is manufactured in accordance with the present invention, makes it possible to cut off immediately the communicative condition between the liquid flow path and the liquid supply port by means of movable member within a period during which bubble is being grown almost isotropically at the earlier stage of bubble creation by means for generating a bubble, and then, with the structure which is arranged so that the interior of the liquid flow path is essentially closed with the exception of the discharge port, the pressure waves generated by growing bubble in the bubble generating area is not allowed to be propagated to the liquid supply port side or to the common liquid supply chamber side. Most of the pressure waves are directed toward the discharge port side, thus enhancing the discharge power significantly. Also, even when a highly viscose recording liquid is used for a high-speed fixation on a recording paper sheet or the like or used for eliminating spread on the boundaries between black and colors, it becomes possible to discharge such highly viscose ink in good condition with the significantly enhanced discharge power. Also, due to environmental changes at the time of recording, particularly under the environment of low temperature and low humidity, the discharge port tends to have more area where the viscosity of ink increases, and ink is not allowed to be discharged normally in some cases at the time of use initiation. However, even under such circumstances, the present invention makes it possible to perform discharging in good condition from the very first shot. Also, with the significantly enhanced discharge power, it becomes possible to reduce the size of heat generating element serving as means for generating a bubble or to reduce energy to be inputted for discharging accordingly.

Also, with no pressure waves of the bubble growth in the bubble generating area being allowed to be propagated to the liquid supply port and the common liquid supply chamber side, there is almost no shifting of liquid to the common liquid supply chamber side, hence minimizing the retracting amount of meniscus at the discharge port after liquid droplet has been discharged. As a result, it is quick to complete ink replenishment (refilling) to the liquid flow path in a designated amount, thus enhancing the discharge frequency significantly when highly precise ink discharges (determinate quantity) are performed.

Also, in the bubble generating area, bubble grows largely on the discharge port side, while suppressing the growth thereof toward the liquid supply port side. As a result, the point of bubble extinction is positioned in the portion on the discharge port side from the central portion of the bubble generating area. Then, the power of extinction thereof can be reduced, while maintaining the bubbling power. This contributes greatly to the enhancement of mechanical and physical breaking life of heat generating element due to the power exerted by bubble extinction in the bubble generating area.

BRIEF DESCRIPTION OF THE DRAWINGS

FIG. 28A shows the one which is provided with a protection film, and

FIG. 28B, the one which is not provided with any protection film.

DETAILED DESCRIPTION OF THE PREFERRED EMBODIMENTS

Now, with reference to the accompanying drawings, the description will be made of the embodiments in accordance with the present invention.

(First Embodiment)

Figure 1:
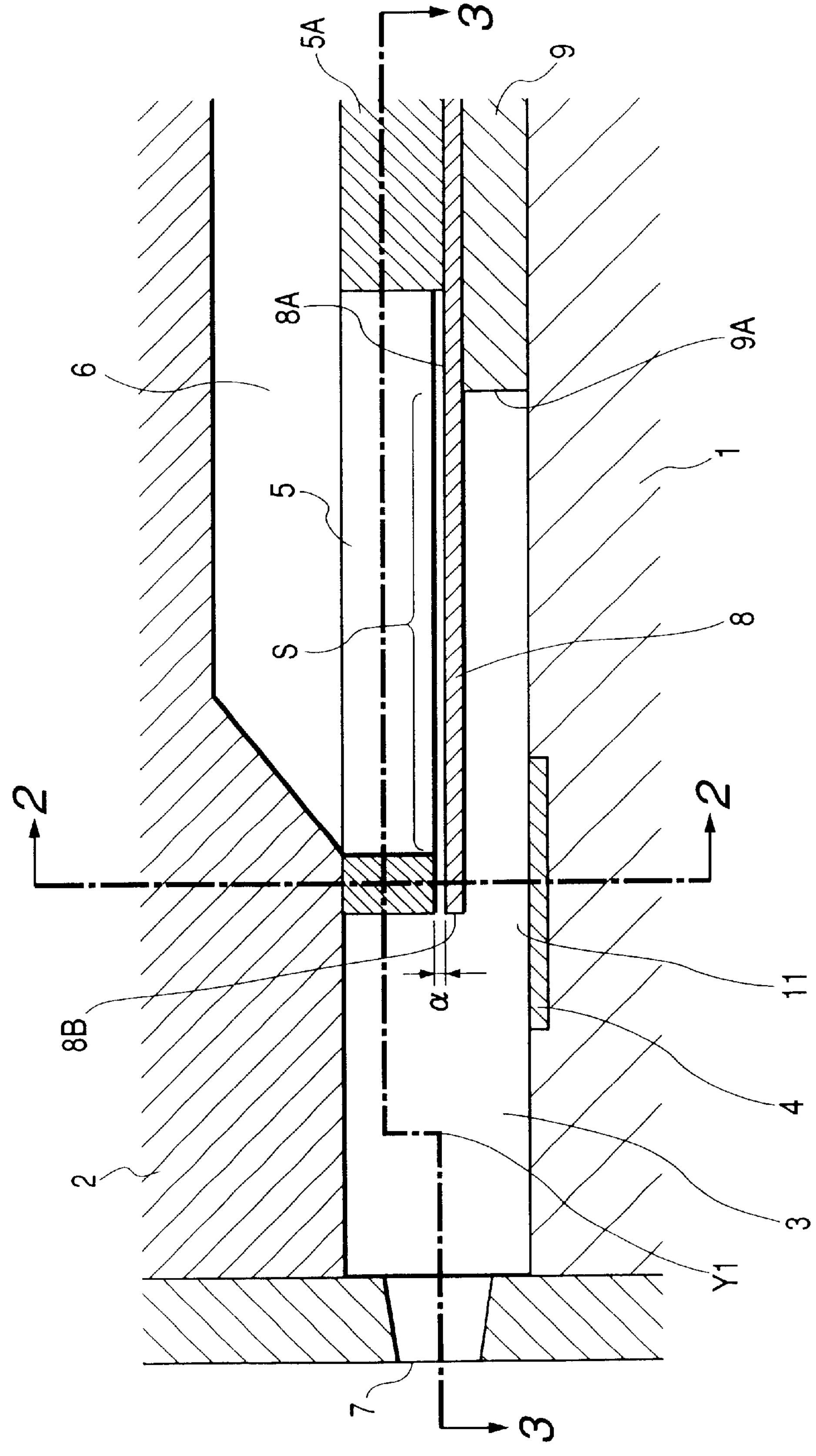
FIG. 1 is a cross-sectional view which shows a liquid discharge head in accordance with a first embodiment of the present invention, taken in the direction of one liquid flow path.
Figure 2:
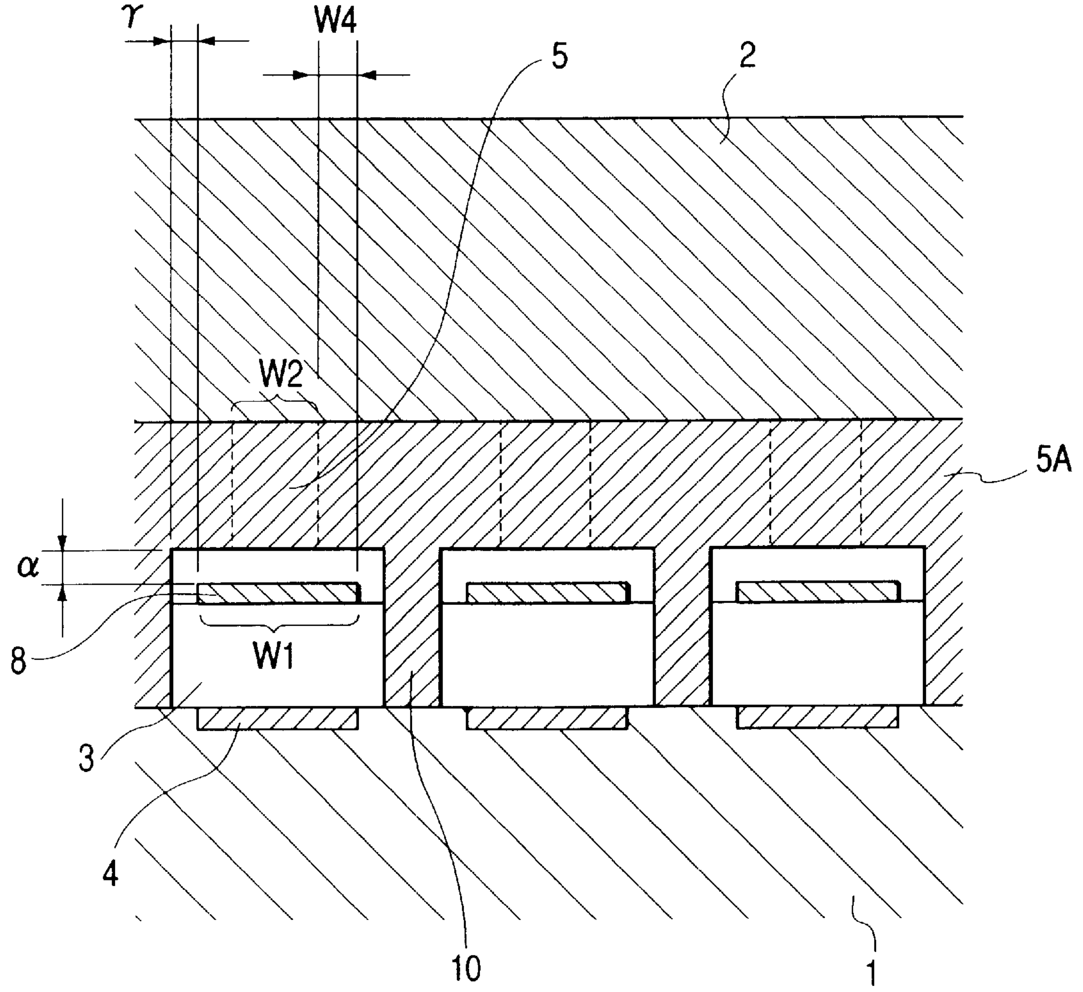
FIG. 2 is a cross-sectional view taken along line 2—2 in FIG. 1.
Figure 3:
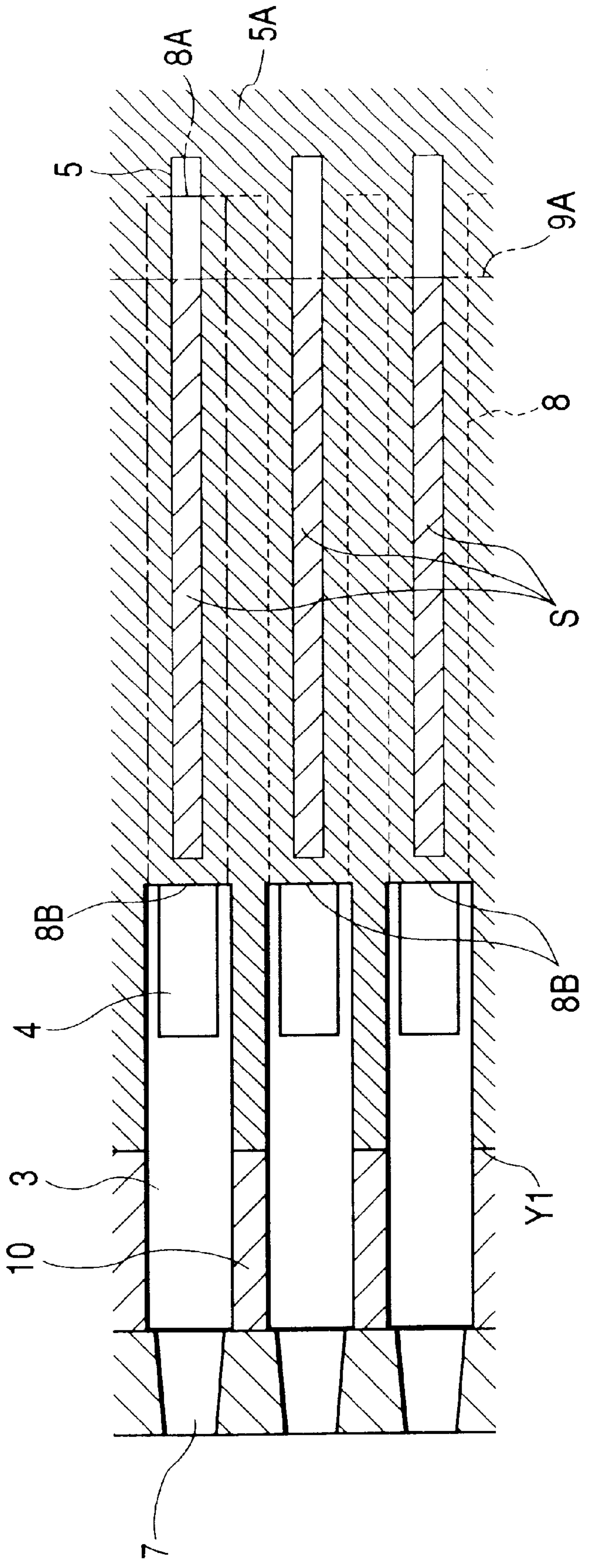
FIG. 3 is a cross-sectional view taken along line 3—3 in FIG. 1.

FIG. 1 is a cross-sectional view which shows a liquid discharge head in accordance with a first embodiment of the present invention, taken in the direction of one liquid flow path. FIG. 2 is a cross-sectional view taken along line 2—2 in FIG. 1. FIG. 3 is a cross-sectional view taken along line 3—3 in FIG. 1, which shifts at the Y1 point from the center of the discharge port to the ceiling plate 2 side.

For the liquid discharge head having the mode of plural liquid paths—a common liquid chamber as shown in FIG. 1 to FIG. 3, the element substrate 1 and the ceiling plate 2 are fixed in the form of lamination by way of the liquid path side walls 10. Between both plate members 1 and 2, the liquid flow path 3 is formed, one end of which is communicated with the discharge port 7, and the other end of which is closed. The liquid flow path 3 is provided for one head in a plural form. Also, for the element substrate 1, heat generating elements 4, such as electrothermal converting devices functioning as means for generating a bubble in liquid supplied each of the liquid flow paths 3, are arranged for the liquid flow paths 3, respectively. In the vicinity of the area where each heat generating element 4 is in contact with discharge liquid, there exists the bubble generating area 11 where bubble is created in discharge liquid when the heat generating element 4 is heated rapidly.

For each of many numbers of liquid flow paths 3, the liquid supply port 5 formed for the supply unit formation member 5A is arranged, thus the common liquid chamber 6 being provided to be communicated with each of the liquid supply ports 5. In other words, many numbers of liquid flow paths 3 are formed to branch out from one single common liquid supply chamber 6, and receive liquid from the common liquid supply chamber 6 in an amount equal to that of liquid discharged from the discharge port 7 with which each liquid flow path 3 is communicated.

Between the liquid supply port 5 and the liquid flow path 3, the movable member 8 is arranged substantially in parallel with the minute gap $\alpha$ (10 $\mu$m or less, for example) to the opening area S of the liquid supply port 5. Here, the area, which is surrounded at least by the free end of the movable member 8 and both sides continued therefrom, is made larger than the opening area S of the liquid supply port 5 (see FIG. 3). The supply unit formation member 5A which is described earlier is arranged through the gap $\gamma$ to the movable member 8 as shown in FIG. 2. The gap $\gamma$ differs depending on the pitches of the flow path, but it is easier for the movable member 8 to block the opening area S if the gap $\gamma$ is large. For the present embodiment, the gap $\alpha$ is 3 $\mu$m, and the gap $\gamma$0 is 3 $\mu$m. Also, the movable member 8 has a width W1, which is wider than the width W2 of the opening area S in the widthwise direction of the flow path side walls 10, so that the movable member is provided with a width to be able to close the opening area S sufficiently. The portion designated by a reference mark 8A of the movable member 8 regulates the end portion on the upstream side of the opening area S of the liquid supply port 5 on the extended line of the end portion on the free end side of the continuous section which continues in the direction in which a plurality of movable members intersect with a plurality of liquid paths (see FIG. 3). Here, as shown in FIG. 3, the supply unit formation member 5A on the discharge port 7 side of the free end 8B of the movable member is set at the same thickness as that of the liquid flow path side walls 10 themselves. With the arrangement thus made, while the movable member 8 can move in the liquid flow path 3 without friction resistance, the displacement thereof to the opening area S side is regulated by the circumference of the opening area S. In this way, it becomes possible to prevent liquid flow from running from the interior of the liquid flow path 3 to the common liquid supply chamber 6 by essentially closing the opening area S, while the essentially closed state to the liquid flow path side is made shiftable to the state where refilling is made possible. Also, for the present embodiment, the movable member 8 is positioned in parallel to the element substrate 1 with respect to the element substrate 1. Then, the end portion 8B of the movable member 8 is the free end which is positioned on the heat generating element 4 side of the element substrate 1, and the other end side is supported by the fixing member 9. Also, this fixing member 9 is arranged to close the end portion of the liquid flow path 3 on the side opposite to the discharge port 7.

In this respect, the opening area S is an area where liquid is essentially supplied from the liquid supply port 5 toward the liquid flow path 3, and as shown in FIG. 1 and FIG. 3, this area is surrounded by the three sides of the liquid supply port 5 and the end portion 9A of the fixing member 9 for the present embodiment.

Figure 4:
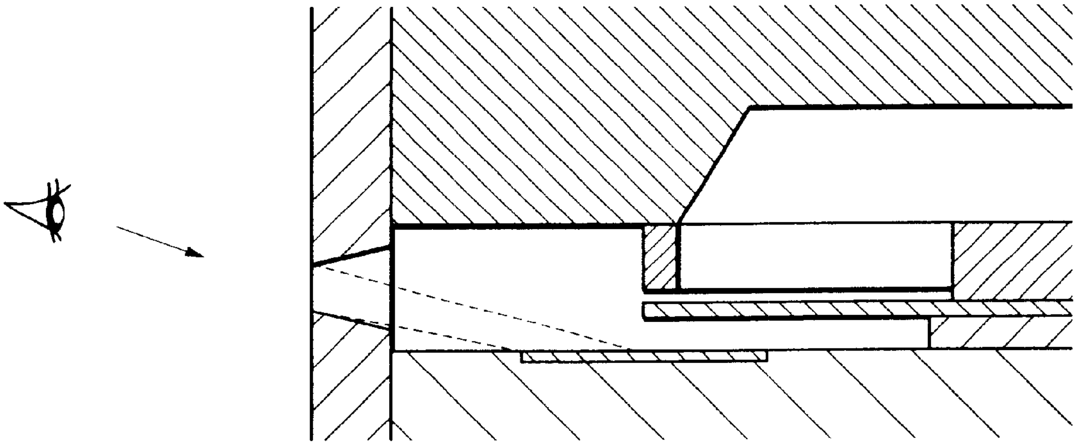
FIG. 4 is a cross-sectional view which illustrates the "linearly communicative state".

Also, as shown in FIG. 4, in accordance with the present embodiment, there is no obstacle, such as valve, between the heat generating element 4 that functions as the electrothermal converting device, and the discharge port 7. Thus, the "linearly communicative state" is maintained to provide the flow path structure which is linear with respect to the liquid flow. It is more preferably desirable to keep the propagating direction of pressure waves generated at the time of bubble creation, and the flow direction of liquid that follows it to be linearly in agreement with the discharge direction, hence forming the ideal condition in which the discharge status, such as the discharge direction of discharged droplets and the discharge speed, is stabilized at an extremely high level. In accordance with the present invention, it should be good enough if only the structure is arranged so that the discharge port 7 and the heat generating element 4, particularly the discharge port side (downstream side) of the heat generating element having the influential power to the bubble on the discharge port side, are connected directly on straight line as one of the definitions whereby to attain such ideal condition as described above or approximate to it. This is a state which is observable from the outer side of the discharge, particularly from the downstream side of the heat generating element if only liquid is conditioned not to move in the flow path (see FIG. 4).

Now, the detailed description will be made of the discharge operation of the liquid discharge head in accordance with the present embodiment. FIG. 5A to FIG. 7B are sectional views of the liquid discharge head in the flow path direction for the illustration of the discharge operation of the liquid discharge head structured as shown in FIG. 1 to FIG. 3, which represent the characteristic phenomena by dividing the operation into six steps as shown in FIG. 5A to FIG. 7B. Also, a reference mark M designates meniscus formed by discharge liquid in FIG. 5A to FIG. 7B.

Figure 5A:
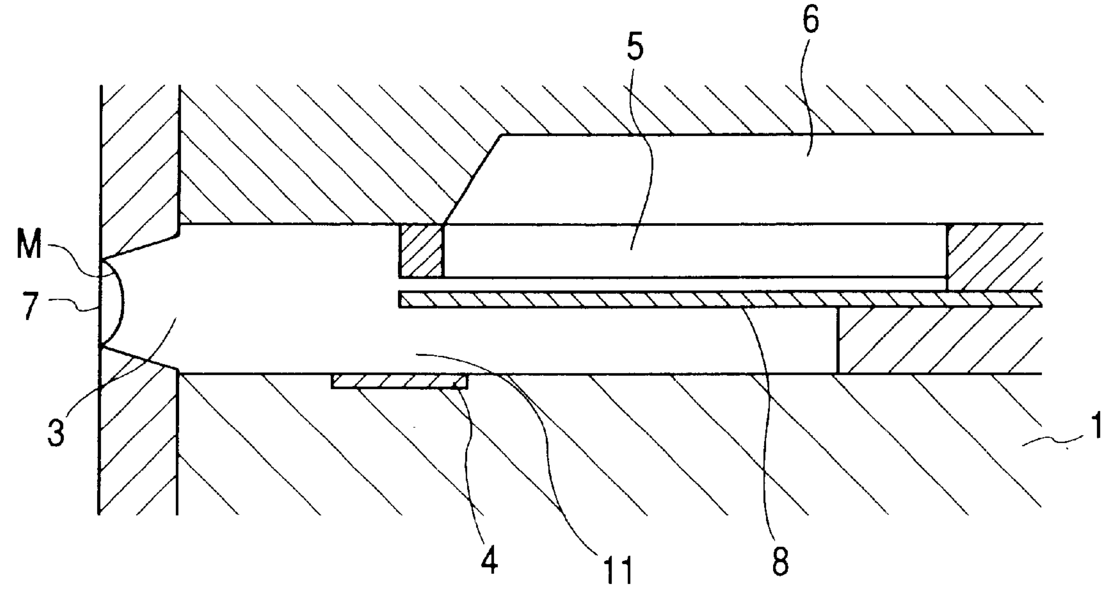
FIGS. 5A and 5B are views which illustrate the discharge operation of the liquid discharge head structured as shown in FIG. 1 to FIG. 3.

FIG. 5A shows the state before energy, such as electric energy, is applied to the heat generating element 4, and represents the state before the heat generating element generates heat. In this state, a minute gap (10 $\mu$m or less) exists between the movable member 8 arranged between the liquid supply port 5 and the liquid flow path 3, and the surface where the liquid supply port 5 is formed.

Figure 5B:
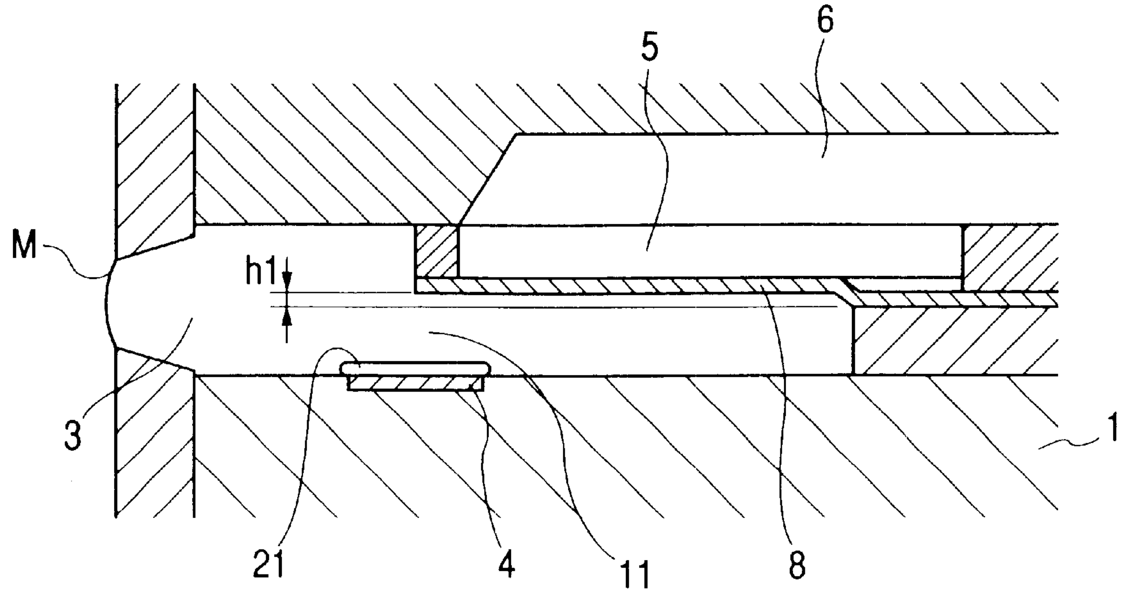

FIG. 5B shows the state where a part of liquid filled in the liquid flow path 3 is heated by the heat generating element 4, and film boiling takes place on the heat generating element 4, thus a bubble 21 growing isotropically. Here, the phrase "bubble grows isotropically" means the condition where the bubble growing speeds toward vertical lines of the bubble surface are substantially equal on various locations of the bubble surface.

Now, in the isotropical growing process of the bubble 21 in the initial stage of bubble creation, the movable member 8 is closely in contact with the circumference of the liquid supply port 5 to close the liquid supply port 5, and the interior of the liquid flow path 3 is essentially closed with the exception of the discharge port 7. At this time, the amount of maximum displacement of the free end of the movable member 8 to the liquid supply port 5 is defined as h1.

Figure 6A:
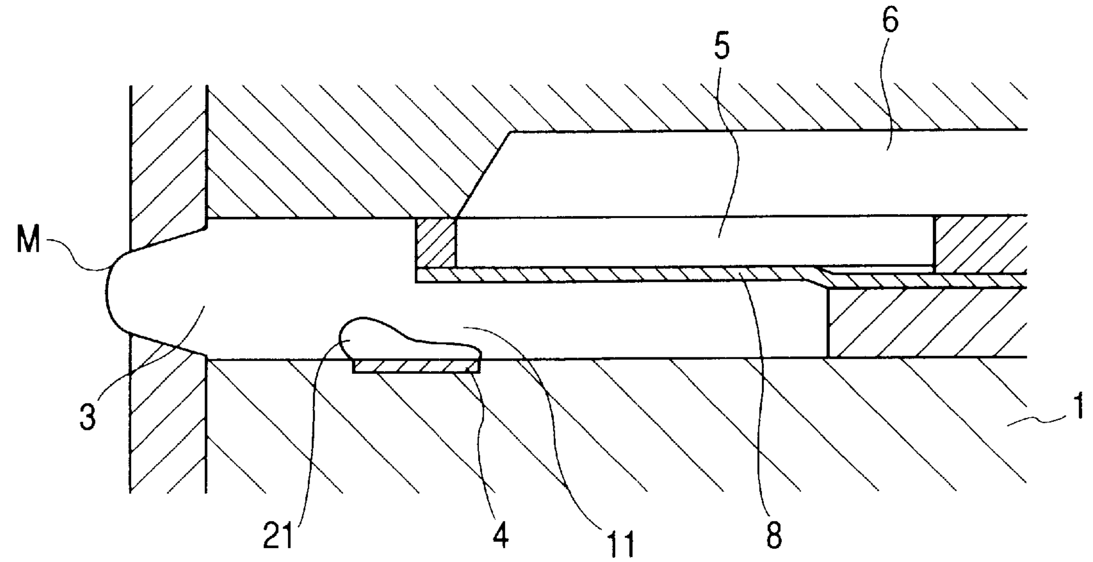
FIGS. 6A and 6B are sectional views which illustrate the discharge operation in continuation of FIGS. 5A and 5B, taken along in the liquid flow path direction of the liquid discharge head.

FIG. 6A shows the state where the bubble 21 continuously grows. In this state, liquid does not flow to the liquid supply port 5 side, because as described above, the interior of the liquid flow path 3 is essentially closed with the exception of the discharge port 7. As a result, the bubble can spread largely to the discharge port 7 side, but it rarely spreads to the liquid supply port 5. Then, the growth of bubble continues on the discharge port 7 side in the bubble generating area 11. On the contrary, the growth of bubble is suspended on the liquid supply port 5 side of the bubble generating area 11. In other words, this condition of bubble growth suspension brings represents the maximum condition of bubble growth on the liquid supply port 5 side of the bubble generating area 11. The bubbling volume at this time is defined as Vr.

Figure 8A:
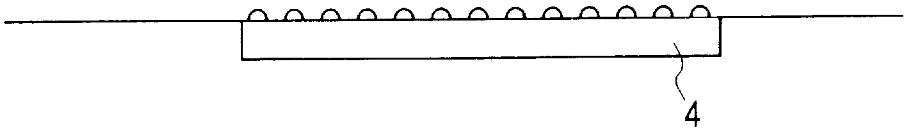
FIGS. 8A, 8B, 8C, 8D and 8E are views that illustrate the state where bubble grows isotropically shown in FIG. 5B.
Figure 8B:
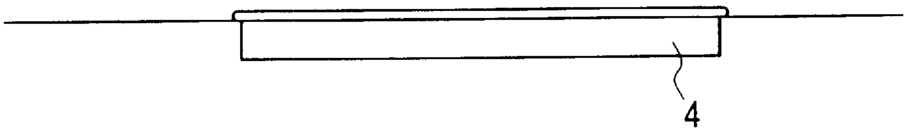
Figure 8C:
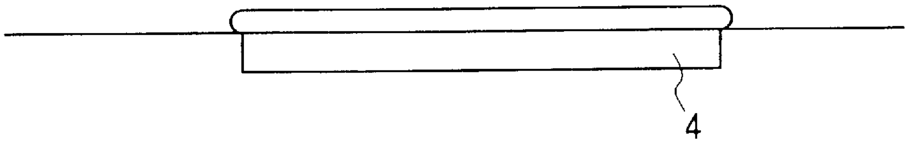
Figure 8D:
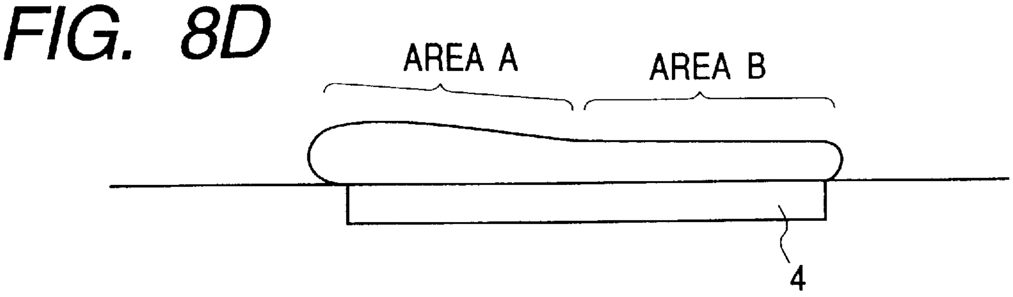
Figure 8E:
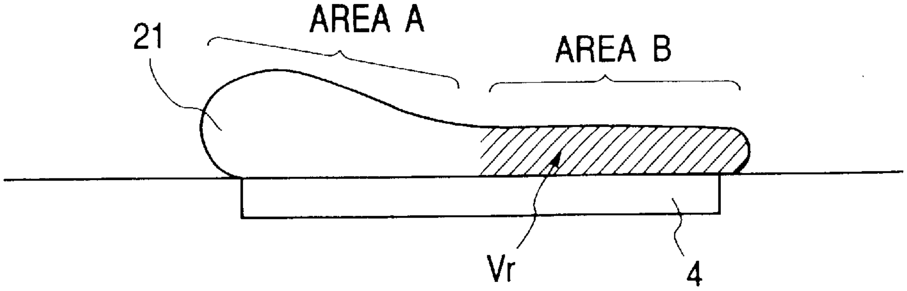

Now, in conjunction with FIGS. 8A to 8E, the detailed description will be made of the bubble growing processes in FIGS. 5A and 5B and FIG. 6A. As shown in FIG. 8A, when the heat generating element is heated, the initial boiling takes place on the heat generating element. Then, after that, as shown in FIG. 8B, the bubble that covers the heat generating element with a film changes into film boiling, and the bubble in the state of film boiling continues its grows isotropically as shown in FIGS. 8B and 8C (the state where bubble grows isotropically is called semi-pillow state). Now, however, when the interior of the liquid flow path 3 is essentially closed with the exception of the discharge port 7 as shown in FIG. 5B, the liquid movement to the upstream side no longer exists. As a result, a part of bubble in the semi-pillow state rarely grows on the upstream side (liquid supply port side), and the remaining part on the downstream side (discharge port side) grows largely. FIG. 6A, FIG. 8D, and FIG. 8E represent this state.

Here, for the sake of illustration, when the heat generating element is heated, the area where no bubble grows on the heat generating element 4 is defined as area B, and the area on the discharge port 7 side where bubble grows is defined as area A. In this respect, the bubbling volume becomes maximum in the area B shown in FIG. 8E, and the bubbling volume then is defined as Vr.

Figure 6B:
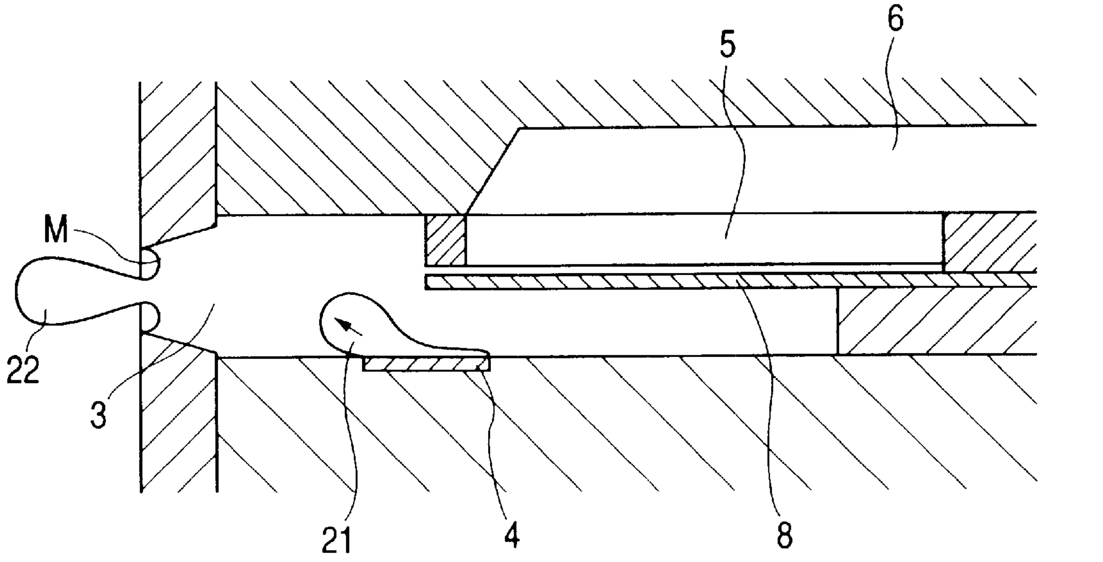

Next, FIG. 6B shows the state where the bubble growth continues in the area A, and the bubble shrinkage begins in the area B. In this state, the bubble grows largely toward the discharge port side in the area A. Then, in the area B, the volume of bubble begins to be reduced. In this way, the free end of the movable member 8 begins to be displaced downward to the position of the normal state due to the restoring force exerted by the rigidity thereof, as well as by the force exerted by bubble extinction in the area B. As a result, the liquid supply port 5 is open, and the common liquid supply chamber 6 and the liquid flow path 3 present the communicative condition.

Figure 7A:
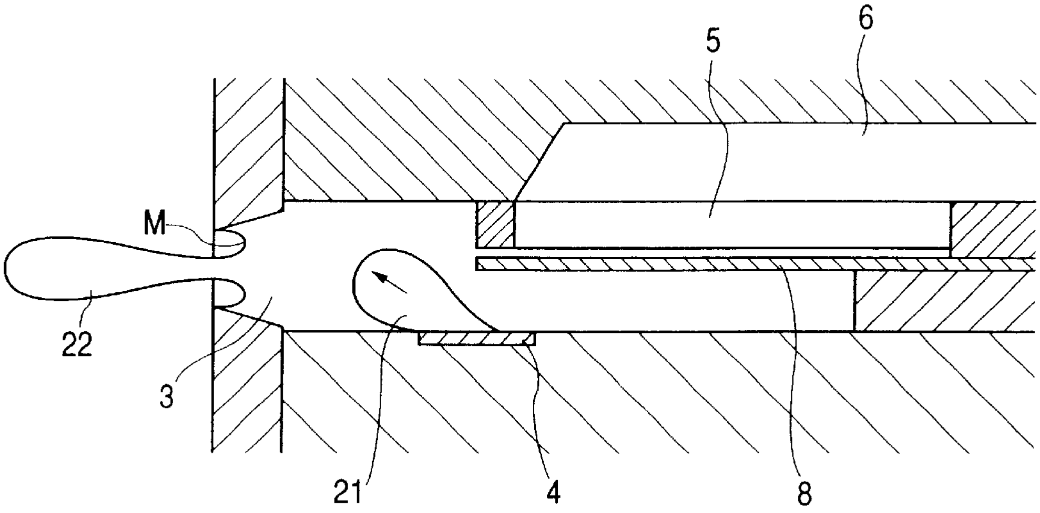
FIGS. 7A and 7B are sectional views which illustrate the discharge operation in continuation of FIGS. 6A and 6B, taken along in the liquid flow path direction of the liquid discharge head.

FIG. 7A shows the state where the bubble 21 has grown to the maximum substantially. In this state, the bubble shows the maximum growth in the area A, and along with this, the bubble has almost ceased to exist in the area B. The maximum bubbling volume then in the area A is defined as Vf. Also, a discharge droplet 22, which is on the way of discharge from the discharge port 7 is still coupled with the meniscus M in a state that it trails a long tail.

Figure 7B:
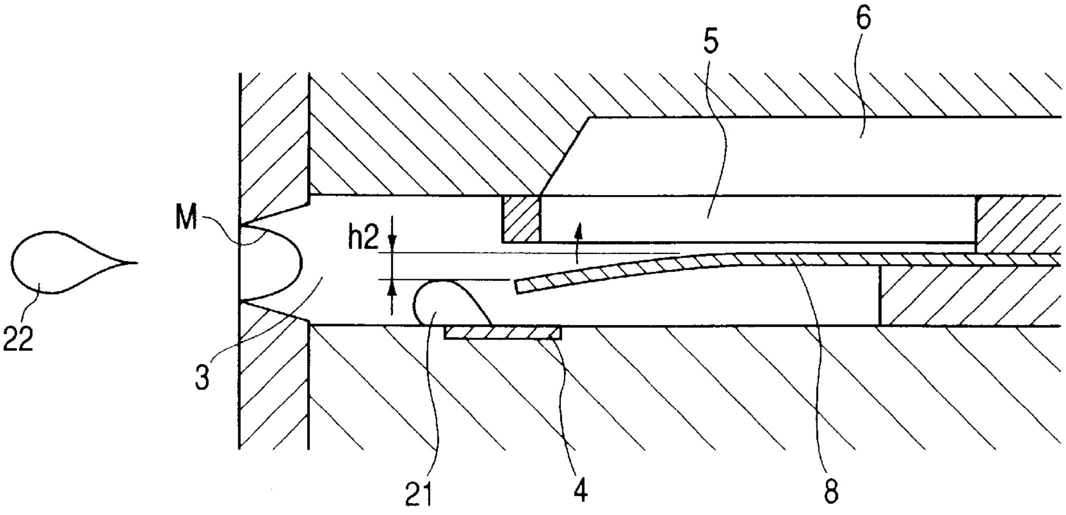

FIG. 7B shows the stage at which the growth of the bubble 21 is suspended, and only the step of extinction remains, while the discharge droplet 22 and the meniscus M is disconnected. Immediately after the bubble growth has changed into the bubble extinction in the area A, the shrinking energy of the bubble 21 acts as the force in terms of total balancing, which enables liquid in the vicinity of the discharge port 7 to shift in the upstream direction. Therefore, the meniscus M is drown from the discharge port 7 into the interior of the liquid flow path 3 at this time, and the liquid column which is connected with the discharge droplet 22 is cut off quickly by the strong force thus exerted. On the other hand, along with the shrinkage of bubble, liquid becomes a rapid flow from the common liquid supply chamber 6 into the liquid flow path 3 through the liquid supply port 5. Then, the flow that draws the meniscus M rapidly into the liquid flow path 3 is reduced suddenly, thus enabling the meniscus M to begin returning to the position before bubbling at a comparatively slower speed. Therefore, the capability of restoration from the vibrated meniscus M is excellent as compared with the liquid discharge method which does not adopt the movable member of the present invention. In this respect, the maximum amount of the displacement of the free end of the movable member 8 to the bubble generating area 11 side at this time is defined as h2.

Lastly, with the complete extinction of the bubble 21, the movable member 8 also returns to the position of the normal state as shown in FIG. 5A. The elasticity of the movable member 8 enables it to be displaced upward to this state (in the direction indicated by a solid arrow in FIG. 7B). Also, in this state, the meniscus M is all returned near to the discharge port 7.

Figure 9:
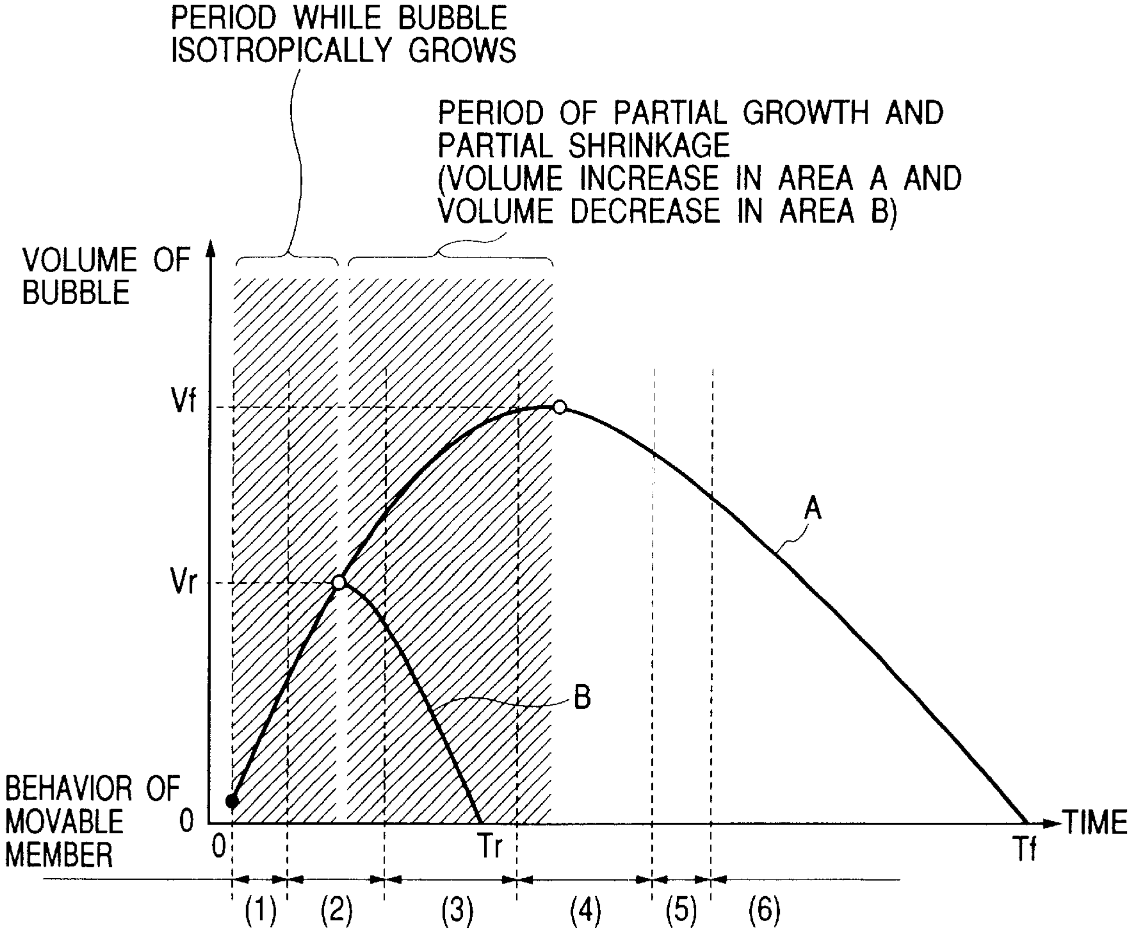
FIG. 9 is a graph which shows the correlations between each time at which the bubble growth changes, and the behavior of movable member in the area A and area B represented in FIG. 5A to FIG. 7B.

Now, with reference to FIG. 9, the description will be made of the correlations between the change of bubbling volumes by times, and the behavior of the movable member in the area A and area B in FIG. 5A to FIG. 7B. FIG. 9 is a graph which shows such correlations, and the curved line A indicates the change of bubbling volumes by each time in the area A, and the curved line B indicates the change of bubbling volumes by each time in the area B.

As shown in FIG. 9, the change of growing volumes of bubble by each time in the area A draws a parabola having the maximum value. In other words, during the period from the bubbling initiation to extinction, the bubbling volume increases as time elapses, and indicates the maximum value at a certain time. After that, it is reduced. In the area B, on the other hand, it takes shorter time from the bubbling initiation to extinction. Also, the maximum growing value of bubble is small, and the time required for reaching the maximum growing volume is short as compared with the case in the area A. In other words, the time required between the bubbling initiation and extinction, and the changes of growing volumes of bubble are largely different in the areas A and B. In the area B, these are smaller.

Particularly in FIG. 9, the bubbling volumes increase to change at the same timing in the initial stage of growth. Consequently, the curved lines A and B are superposed. In other words, the period, during which the bubble grows isotropically (semi-pillow), occurs in the initiation stage of bubble growth. After that, the curved line A describes the one that increases and reaches the maximum point, but at a certain time, the curved line B branches out from the curved line A to describe the one that indicates the reduction of bubbling volume. In other words, although the bubbling volume increases in the area A, the period during which the bubbling volume is reduced (a shrinking period in the partially growing portion) occurs in the area B.

Then, on the basis of the manner in which bubble grows as described above, the movable member presents its behavior as given below in the mode that the free end of the movable member partially covers the heat generating element as shown in FIG. 1. In other words, during the period (1) in FIG. 9, the movable member is displaced upward to the liquid supply port. During period (2) in FIG. 9, the movable member is closely in contact with the liquid supply port, and the interior of the liquid flow path is essentially closed with the exception of the discharge port. The initiation of this closed condition takes places during the period when the bubble grows isotropically. Next, during period (3) in FIG. 9, the movable member is displaced downward to the position of the normal state. After a specific time has elapsed since the initiation of the shrinking period in the partially growing portion, the movable member begins to release the liquid supply port. Then, during period (4) in FIG. 9, the movable member is further displaced downward from the normal state. Next, during period (5) in FIG. 9, the downward displacement of the movable member is almost suspended, and the movable member is in the equilibrium condition in the released position. Lastly, during period (6) in FIG. 9, the movable member is displaced upward to the position of the normal state.

Also, understandable from the representation of FIG. 9, given the maximum volume of bubble (the bubble in the area A) that grows in the bubble generating area 11 on the discharge port 7 side as Vf, and the maximum volume of bubble (the bubble in the area B) that grows in the bubble generating area 11 on the liquid supply port 5 side as Vr, the relationship of Vf>Vr is always satisfied for the head of the present invention. Further, given the life time (the time required from the bubble creation to the extinction thereof) of bubble (the bubble in the area A) that grows in the bubble generating area 11 on the discharge port 7 side as Tf, and the life time of bubble (the bubble in the area B) that grows in the bubble generating area 11 on the liquid supply port 5 side as Tr, the relationship of Tf>Tr is always satisfied for the head of the present invention. Then, in order to establish such relationship as described above, the point at which bubble becomes extinct is positioned in the bubble generating area 11 on the discharge port 7 side from the central portion thereof.

Further, as understandable from the representation of FIG. 5B, as well as that of FIG. 7B, there exists the relationship of (h1<h2), that is, the amount h2 which shows the maximum displacement of the free end of the movable member 8 to the bubble generating means 4 side along with the extinction of bubble is larger than the amount h1 which shows the maximum displacement of the free end of the movable member 8 to the liquid supply port 5 side at the initiation of bubble creation. For example, the h1 is 2 μm, while the h2 is 10 μm. With the establishment of this relationship, the bubble growth to the rear side of the heat generating element (in the direction opposite to the one toward the discharge port) is suppressed at the initiation of bubbling, while promoting the bubble growth to the front side of the heat generating element (in the direction toward the discharge port). In this way, the bubbling power created by the heat generating element is converted into the motion energy of liquid droplet to enable liquid to fly from the discharge port, hence enhancing the efficiency of this conversion.

The description has been made of the head structure of the present embodiment, as well as the liquid discharge operation. Here, in accordance with the present embodiment, the growing component of bubble toward the downstream side and that of bubble toward the upstream side is not equal. The growing component toward the upstream side is almost extinct, thus suppressing the liquid shift to the upstream side. With the suppression of the liquid flow to the upstream side, the growing component of bubble to the upstream side is not lost, and most of the component is directed toward the discharge port, thus enhancing the discharge power significantly. Further, the retracting amount of meniscus after discharge is reduced, and the amount of extrusion of meniscus from the orifice surface is reduced accordingly at the time of refilling. As a result, the meniscus vibration is suppressed to stabilize discharges at all the driving frequencies from low to high frequency.

Now, the description will be made of the method for manufacturing the liquid discharge head described above.

The circuits and elements required for driving the heat generating element 4 of the liquid discharge head described above, and for controlling the driving thereof are arranged on the element substrate 1 or on the ceiling plate 2 dividedly depending on the functions that each of them performs. Also, these circuits and elements are formed easily and minutely by use of semiconductor wafer process technologies, because the element substrate 1 and the ceiling plate 2 are formed by silicon material.

Now, hereunder, the description will be made of the structure of the element substrate 1 formed by use of the semiconductor wafer process technologies.

Figure 10:
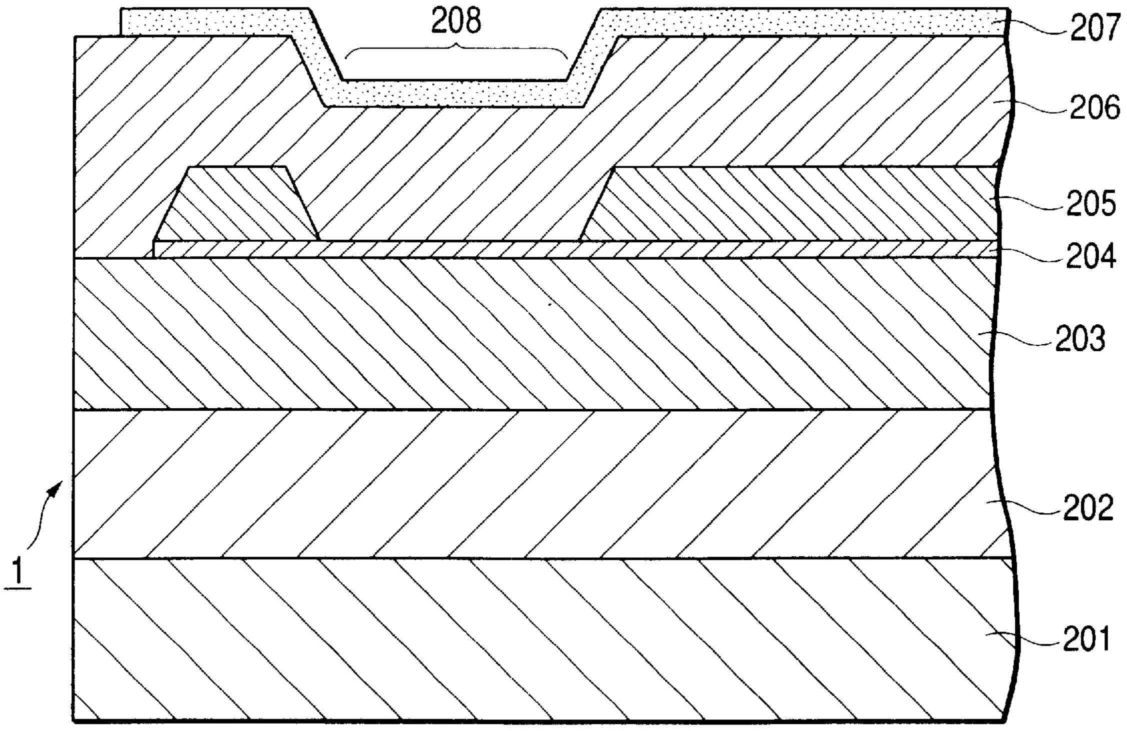
FIG. 10 is a cross-sectional view which shows the element substrate used for the liquid discharge head in accordance with the first embodiment.

FIG. 10 is a cross-sectional view which shows the element substrate 1 used for the liquid discharge head of various embodiments described above. For the element substrate 1 shown in FIG. 10, the thermal oxidation film 202 which serves as heat accumulation layer, and the interlayer film 203 which dually serves heat accumulation layer are laminated on the surface of the silicon substrate 201 in that order. As the interlayer film 203, $SiO_2$ film or $Si_3N_4$ film are used, and on the surface of the interlayer 203, the resistive layer 204 is locally formed, and on the surface of the resistive layer 204, wiring 205 is formed locally. As the wiring 205, Al or Al alloy wiring, such as Al-Si, Al-Cu or the like, is used. On the surface of the wiring 205, resistive layer 204, and interlayer 203, the protection layer 206 which is formed by $SiO_2$ or $Si_3N_4$ film is formed. On the surface portion of the protection layer 206 and circumference thereof, which correspond to the resistive layer 204, the cavitation proof film 207 is formed in order to protect the protection film 206 from chemical and physical shocks that follow the heat generation of the resistive layer 204. The surface area of the resistive layer 204 having no wiring formed thereon is the thermal activation unit 208 that is the portion where the heat of resistive layer 204 is activated.

The films on the element substrate 1 are formed on the surface of the silicon base plate 201 one after another by semiconductor manufacturing technologies, and the thermoactive portion 208 is provided for the silicon base plate 201.

Figure 11:
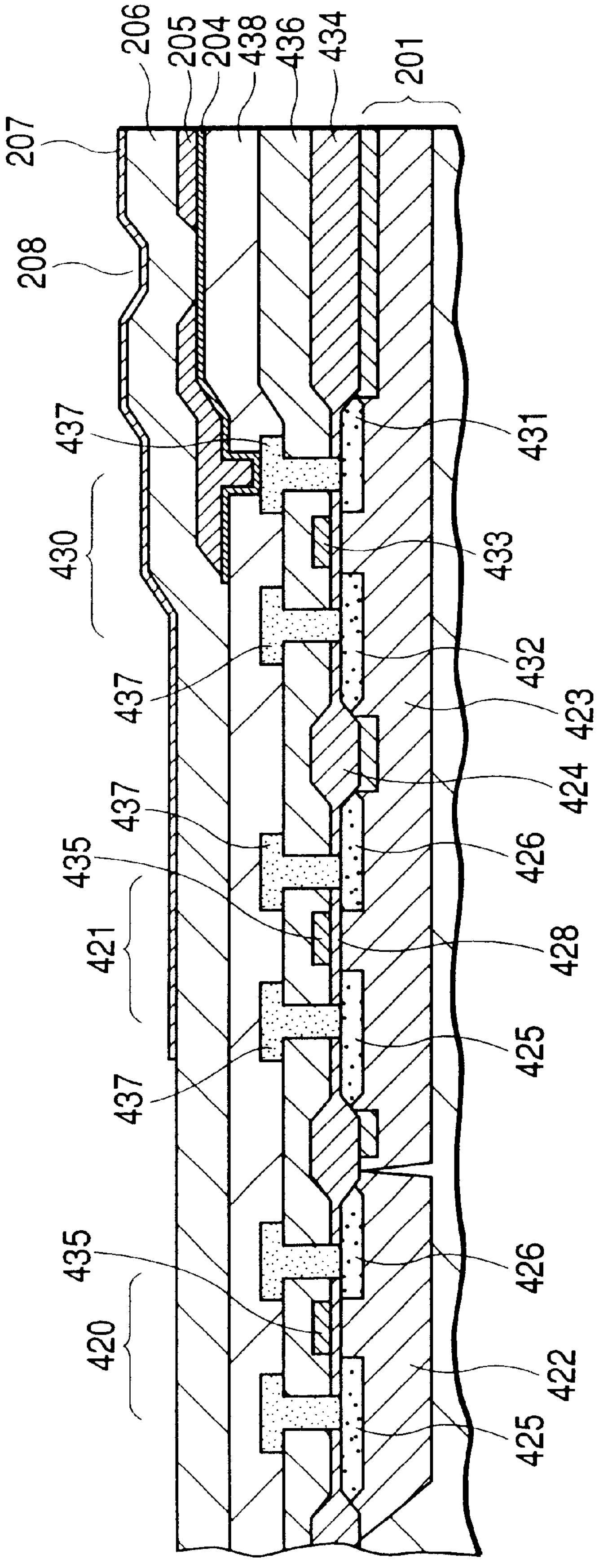
FIG. 11 is a cross-sectional view which shows schematically the principal elements of the element substrate represented in FIG. 10 by vertically cutting the element substrate.

FIG. 11 is a cross-sectional view which shows the element substrate 1 schematically by vertically cutting the principal devices on the element substrate 1 as shown in FIG. 10.

As shown in FIG. 11, the N type well region 422 and the P type well region 423 are locally provided for the surface layer of the silicon substrate 201 which is the P conductor. Then, using the general MOS process the P-MOS 420 is provided for the N type well region 422, and the N-MOS 421 is provided for the P type well region 423 by the execution of impurity plantation and diffusion, such as the ion plantation. The P-MOS 420 comprises the source region 425 and the drain region 426, which are formed by implanting N type or P type impurities locally on the surface layer of the N type well region 422, and the gate wiring 435 deposited on the surface of the N type well region 422 with the exception of the source region 425 and the drain region 426 through the gate insulation film 428 which is formed in a thickness of several hundreds of Å, and some others. Also, the N-MOS 421 comprises the source region 425 and the drain region 426, which are formed by implanting N type or P type impurities locally on the surface layer of the P type well region 423, and the gate wiring 435 deposited on the surface of the P type well region 423 with the exception of the source region 425 and the drain region 426 through the gate insulation film 428 which is formed in a thickness of several hundreds of Å, and some others. The gate wiring 435 is made by polysilicon deposited by the CVD method in a thickness of 4000 Å to 5000 Å. Then, the C-MOS logic is structured with the P-MOS 420 and the N-MOS 421 thus formed.

The portion of the P type well region 423, which is different from that of the N-MOS 421, is provided with the N-MOS transistor 430 for driving use of the electrothermal converting devices. The N-MOS transistor 430 also comprises the source region 432 and the drain region 431, which are provided locally on the surface layer of the P type well region 423 by the impurity implantation and diffusion process or the like, and the gate wiring 433 deposited on the surface portion of the P type well region 423 with the exception of the source region 432 and the drain region 431 through the gate insulation film 428, and some others.

In accordance with the present embodiment, the N-MOS transistor 430 is used as the transistor for driving use of the electrothermal converting devices. However, the transistor is not necessarily limited to this one if only the transistor is capable of driving a plurality of electrothermal converting devices individually, and also, capable of obtaining the fine structure as described above.

Between each of the elements, such as between the P-MOS 420 and the N-MOS 421, between the N-MOS 421 and the N-MOS transistor 430, the oxidation film separation area 424 is formed by means of the field oxidation in a thickness of 5000 Å to 10000 Å. Then, with the arrangement of such oxidation film separation area 424, those elements are separated from each other. The portion of the oxidation film separation area 424, that corresponds to the thermoactive portion 208, is made to function as the heat accumulating layer 434 which is the first layer, when observed from the surface side of the silicon substrate 201.

On each surface of the P-MOS 420, N-MOS 421, and N-MOS transistor 430 elements, the interlayer insulation film 436 of PSG film, BPSG film, or the like is formed by the CVD method in a thickness of approximately 7000 Å. After the interlayer insulation film 436 is smoothed by heat treatment, the wiring is arranged using the Al electrodes 437 that become the first wiring layer by way of the contact through hole provided for the interlayer insulation film 436 and the get insulation film 428. On the surface of the interlayer insulation film 436 and the Al electrodes 437, the interlayer insulation film 438 of $SiO_2$ is formed by the plasma CVD method in a thickness of 10000 Å to 15000 Å. On the portions of the surface of the interlayer insulation film 438, which correspond to the thermoactive portion 208 and the N-MOS transistor 430, the resistive layer 204 is formed with $TaN_{0.8,hex}$ film by the DC sputtering method in a thickness of 1000 Å approximately. The resistive layer 204 is electrically connected with the Al electrode 437 in the vicinity of the drain region 431 by way of the through hole formed on the interlayer insulation film 438. On the surface of the resistive layer 204, the Al wiring 205 is formed to become the second wiring for each of the electrothermal transducing devices.

The protection film 206 on the surfaces of the wiring 205, the resistive layer 204, and the interlayer insulation film 438 is formed with $Si_3N_4$ film by the plasma CVD method in a thickness of 10000 Å. The cavitation proof film 207 deposited on the surface of the protection film 206 is formed with a thin film of at least one or more amorphous alloy, selected from among Ta (tantalum), Fe (iron), Ni (nickel), Cr (chromium), Ge (germanium), Ru (ruthenium), or the like, in a thickness of approximately 2500 Å.

Now, with reference to FIG. 12A to FIG. 15C, the description will be made of the processing steps in which the movable member 8, the liquid flow path walls 10, and the liquid supply port 5 are arranged on the element substrate 1 as shown in FIG. 1 to FIG. 3. Now, as to FIG. 12A to FIG. 15C, FIGS. 12A to 12C, FIGS. 13A to 13C, FIGS. 14A to 14C, and FIGS. 15A to 15C are sectional views taken through the center of the heat generating element 4 in the direction orthogonal to the direction of the liquid flow path 3 formed on the element substrate 1. FIGS. 12D to 12F, FIGS. 13D to 13F, and FIGS. 14D to 14F are sectional views taken through the center of the liquid flow path 3 in the direction parallel to the liquid flow path 3 formed on the element substrate 1. FIGS. 12G to 12I, FIGS. 13G to 13I, and FIGS. 14G to 14I are contracted plan views here.

Figure 12A:
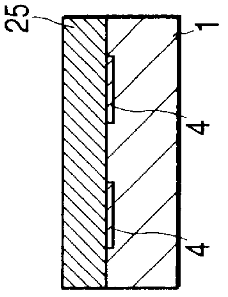
FIGS. 12A, 12B, 12C, 12D, 12E, 12F, 12G, 12H and 12I are views which illustrate a method for manufacturing the element substrate used for the liquid discharge head in accordance with the first embodiment of the present invention.
Figure 12B:
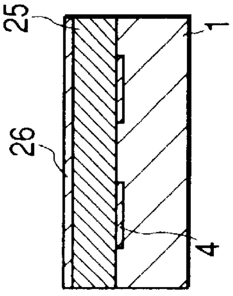
Figure 12C:
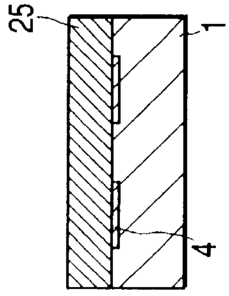
Figure 12D:
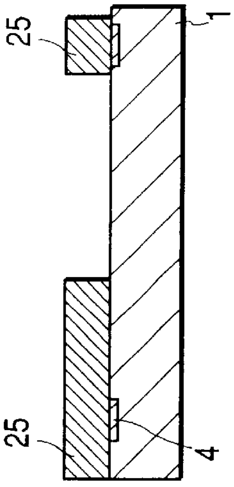
Figure 12E:
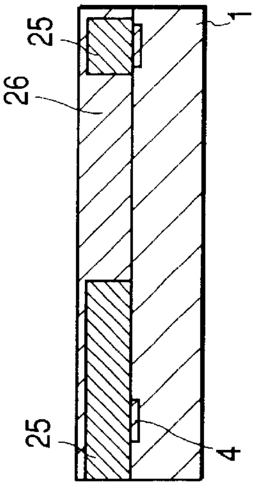
Figure 12F:
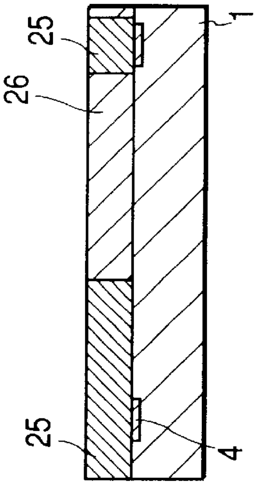
Figure 12G:
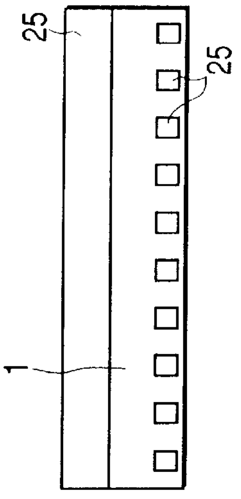

At first, as shown in FIGS. 12A, 12D, and 12G, Al film (first gap formation layer) is formed on the plane of the element substrate 1 on the heat generating element 4 side by sputtering method in a thickness of approximately 20 $\mu$m. The Al film thus formed is patterned by use of known photolithographic process to form a plurality of Al film patterns 25 on the positions corresponding to the heat generating element 4 and electrode unit. Each of the Al film patterns 25 functions as a first gap formation member (which regulates gap) forms a gap between the heat generating element 4 and the movable member 8 to be described later, which are arranged on the surface of the element substrate 1.

The Al patterns 25 function as etching stop layer when forming valve configuration by means of dry etching. This arrangement is made to prevent the thin film, such as Ta, that serves as the cavitation proof film 207, and the SiN film that serves as the protection layer 206 on the resistive element on the element substrate 1 from being etched by etching gas. Also, in order not to allow the plane of the element substrate 1 on the heat generating element 4 side to be exposed when the liquid flow path 3 is formed by means of dry etching, the width of the liquid flow path 3 on each of the Al film patterns 25 is made wider in the direction orthogonal to the flow path direction of the liquid flow path 3 than the width of liquid flow path 3 formed ultimately. Further, at the time of dry etching, ion seed and radical are generated by the decomposition of $CF_4$, $C_xF_y$, $SF_6$ gas, and the heat generating element 4 and functional elements on the element substrate 1 may be damaged in some cases. However, the Al film pattern 25 receives such ion seed and radical so as to protect the heat generating element 4 and functional element on the element substrate 1 from being damaged.

Figure 12H:
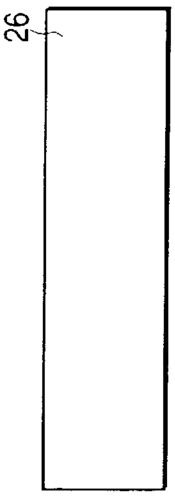

Then, as shown in FIGS. 12B, 12E, and 12H, on the surface of the Al film pattern 25 and the surface of the element substrate 1, the SiN film 26, which serves as the material film to form a part of flow path side walls 10, is formed by use of plasma CVD method in a thickness of approximately 20.0 $\mu$m so as to cover the Al film pattern 25.

Figure 12I:
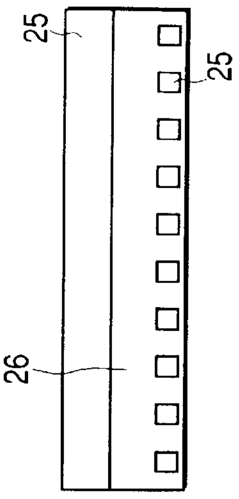

Then, as shown in FIGS. 12C, 12F, and 12I, the SiN film 26 is polished by use of CMP (chemical mechanical polishing) method to make it flat until the surface of the Al film pattern 25 and the surface of the SiN film 26 are positioned substantially on the same plane with the surface of the Al film pattern 25 being exposed. Then, there is formed the alignment pattern which becomes reference when photolithographic process is executed as described later. In this way, the Al film pattern 25 is formed on the portion that becomes the liquid flow path 3 and the portion that becomes electrode pad, while the SiN layer 26 is formed on the other portion than those portions. In the condition thus obtained, the Al film pattern 25 which becomes the liquid flow path 3 functions as the first gap formation member, and the SiN layer 26 functions as the fixing portion (high pedestal) for the movable member, respectively.

Figures 13A, 13B, 13C, 13D, 13E, 13F, 13G, 13H, 13I:
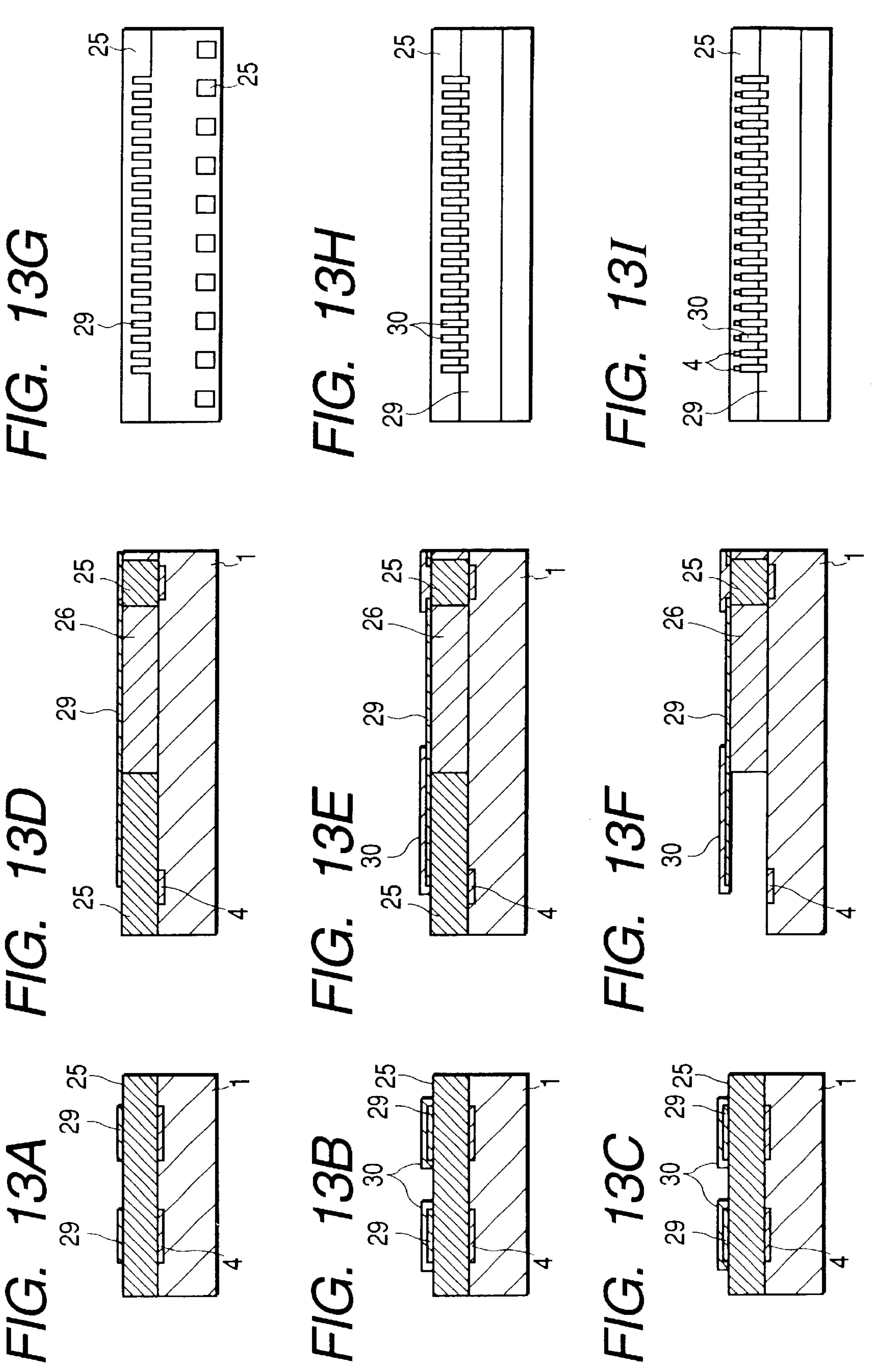
FIGS. 13A, 13B, 13C, 13D, 13E, 13F, 13G, 13H and 13I are views which illustrate the method for manufacturing the element substrate used for the liquid discharge head in accordance with the first embodiment of the present invention, and illustrate the steps in continuation of the steps shown in FIGS. 12A to 12I.

Next, as shown in FIGS. 13A, 13D, and 13G, on the surface of the SiN film 26 and Al film pattern 25 polished by use of the CMP method, the SiN film 29, which is the material film for the formation of the movable member 8, is formed by means of plasma CVD method in a thickness of approximately 3.0 $\mu$m. Then, the SiN film 29 thus formed is dry etched by an etching apparatus using dielectric coupling plasma to leave the portion of SiN film 29 corresponding to the Al film pattern 25, which becomes a part of liquid flow path 3. This SiN film 29 is ultimately formed to be the movable member 8. Therefore, the width of the liquid flow path 3 in the direction orthogonal to the flow path direction on the pattern of the SiN film 29 is made narrower than the width of the liquid flow path 3 which is ultimately formed. This movable member 8 is formed by the movable portion that includes the free end 8B, and the fixing portion 8A which is bonded to the high pedestal formed by the SiN layer 26.

Next, as shown in FIGS. 13B, 13E, and 13H, TiW (titanium-tungsten) film (second gap formation layer) is formed by sputtering method in a thickness of approximately 3.0 $\mu$m so as to cover the SiN film 29 which becomes the movable member 8. The TiW film is patterned by use of known photolithographic process to form the second gap formation member 30 locally on the surface and sides of the SiN film 29 for forming the gap $\alpha$ (see FIG. 1) between the upper surface of the movable member 8 and the liquid supply port 5, and the gap $\gamma$ (see FIG. 2) between both sides of the movable member 8 and the flow path side walls 10.

Next, as shown in FIGS. 13C, 13F, and 13I, the portion of the Al film pattern 25 (the first gap formation member) that becomes the liquid flow paths 3 is completely removed by means of hot etching using a mixed solution of acetic acid, phosphoric acid, and nitric acid. At this juncture, the portion of the Al film pattern 25 that becomes the electrode pad is protected by the second gap formation member 30 formed by TiW film to be eroded by the aforesaid mixed solution.

Figures 14A, 14B, 14C, 14D, 14E, 14F, 14G, 14H, 14I:
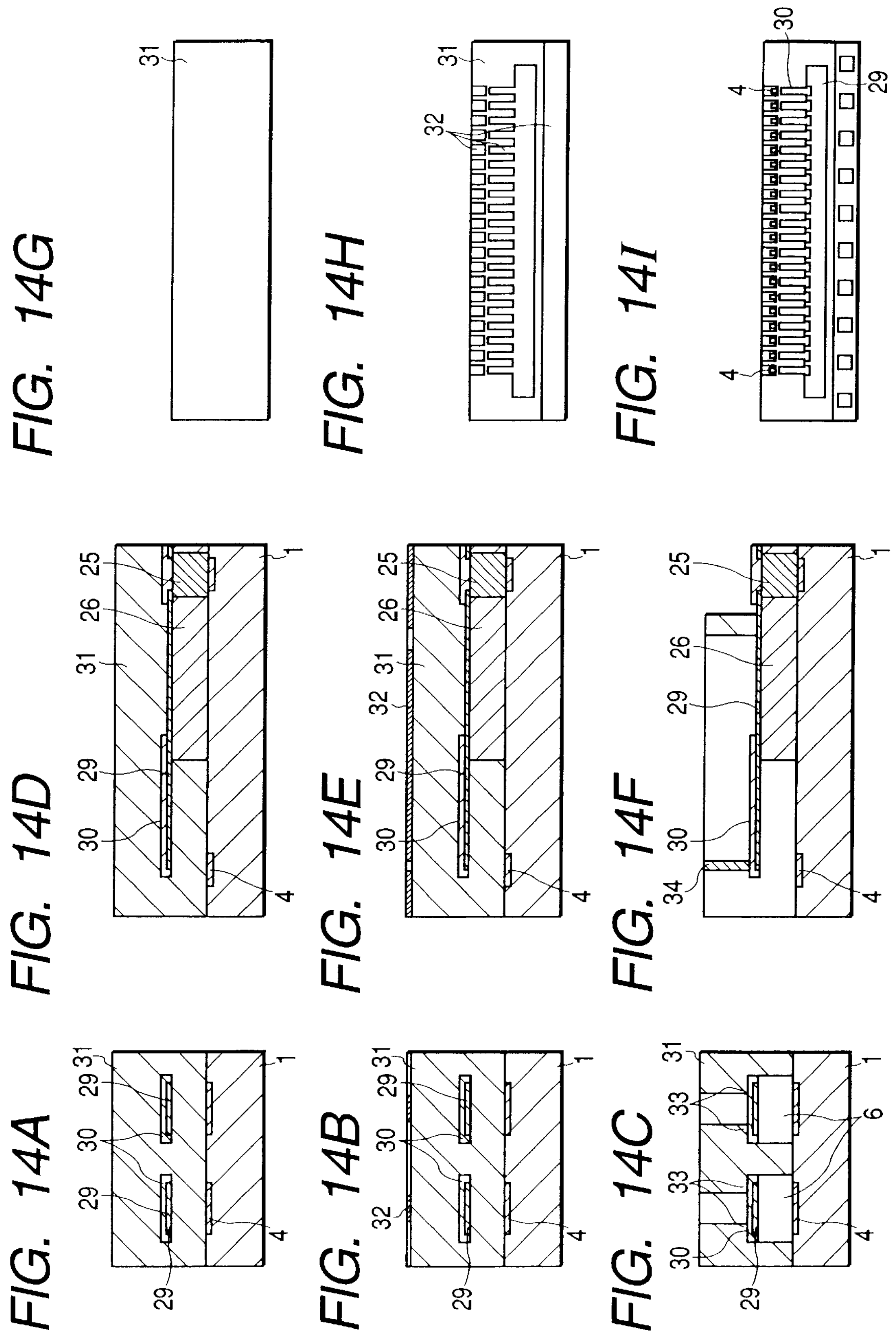
FIGS. 14A, 14B, 14C, 14D, 14E, 14F, 14G, 14H and 14I are views which illustrate the method for manufacturing the element substrate used for the liquid discharge head in accordance with the first embodiment of the present invention, and illustrate the steps in continuation of the steps shown in FIGS. 13A to 13I.

Next, as shown in FIGS. 14A, 14D, and 14G, an appropriate amount of negative type photosensitive epoxy resin (wall material) 31, such as SU-8-50 (product name: manufactured by Microchemical Corporation), is dropped onto the element substrate 1, and spin-coated in a thickness of approximately 40 to 60 $\mu$m. Here, by the aforesaid spin-coating process, it is possible to coat photosensitive epoxy resin 31 smoothly to form the flow path side walls 10 on which the ceiling plate 2 is bonded.

In continuation, on conditions shown in Table 1, hot plate is used to prebake the photosensitive epoxy resin 31 at 90° C. for 5 minutes. After that, as shown in FIGS. 14B, 14E, and 14H, the mask pattern 32 is placed, and by use of an exposing device (Canon: MPA 600), the photosensitive epoxy resin 31 is exposed with exposing light in a quantity of 2 [J/cm$^2$].

TABLE 1

| | |
|---|---|
| Material: | SU-8-50 (manufactured by Microchemical Corp.) |
| Coating thickness: | 50 $\mu$m |
| Prebaking: | 90° C. 5 minutes Hot plate |
| Exposing device: | MPA 600 (Canon Mirror Projection aligner) |
| Quantity of exposure light: | 2 [J/cm$^2$] |
| PEB: | 90°C. 5 minutes Hot plate |
| Developer: | propylene glycol 1 - monomethyl ether acetate (manufactured by Kishida Kagaku) |
| Regular baking: | 200° C. 1 hr |

The exposed portion of the photosensitive epoxy resin 31 is hardened, while the portion which is not exposed is not hardened. Therefore, in the aforesaid exposing step, only the portion other than the portion that becomes the liquid supply port 5 is exposed. Here, the second gap formation member 30 is formed by the light shielding TiW film, and, therefore, it functions as the mask that does not allow the photosensitive epoxy resin 31 to be exposed when the resin flows into underneath. In the actual case, however, the photosensitive epoxy resin 31 is not necessarily filled into underneath the movable member 8 completely.

Figure 15A:
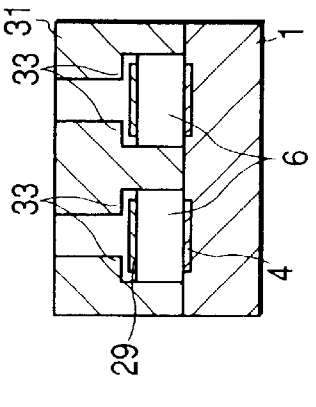
FIGS. 15A, 15B and 15C are views which illustrate the method for manufacturing the element substrate used for the liquid discharge head in accordance with the first embodiment of the present invention, and illustrate the steps in continuation of the steps shown in FIGS. 14A to 14I.
Figure 15B:
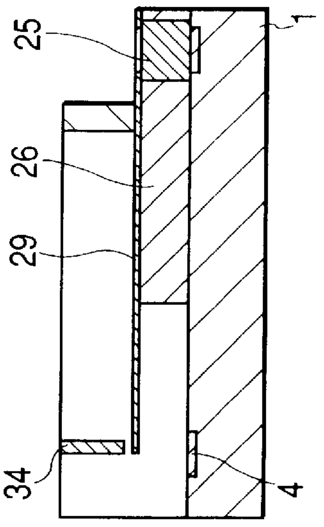
Figure 15C:
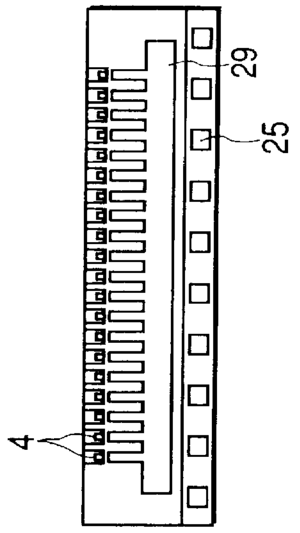

Then, as shown in FIGS. 14C, 14F, and 14I, using the developer, propylene glycol 1-monomethyl ether acetate (manufactured by Kishida Kagaku), the photosensitive epoxy resin 31 on the non-photosensitive portion (non-exposed portion) is removed. In this manner, the liquid supply port 5 is formed on the upper part of the second gap formation member 30 on the movable member 8 which is shielded by the pattern mask 32, and then, the liquid flow path 3 is formed on the lower part of the movable member 8 which is shielded by the second gap formation member 30 formed by the TiW film. Further, after that, the regular baking is made at 200° C. for one hour. In this respect, the area of the non-photosensitive portion (non-exposed portion) by use of the pattern mask is smaller than the area of the non-photosensitive portion (non-exposed portion) by the presence of the second gap formation member 30. Therefore, the opening area for hole portion that becomes the liquid supply port 5 becomes smaller than the flat area of the liquid flow path 3 (the movable region of the movable member 8 formed by the SiN film). As a result, as shown in FIGS. 14C and 15A, a step is created for the liquid flow side walls 10. This step becomes the side stopper 33 that regulates the displacement of the movable member 8. Here, the top end stopper 34 (see FIGS. 14F and 15B) formed by the hardened portion of the photosensitive epoxy resin 31 is also the one that regulates the displacement of the movable member. Lastly, as shown in FIGS. 15A, 15B, and 15C, the TiW film serving as the second gap formation member 30 is removed by means of hot etching using hydrogen peroxide.

As described above, the movable member 8, the liquid path side walls 10, and the liquid supply port 5 are formed on the element substrate 1.

Now, with reference to FIGS. 16A to 16D, the description will be made of the formation process of the ceiling plate which is provided with the common liquid supply chamber 6 of large capacity communicated with a plurality of liquid supply ports 5.

Figure 16A:
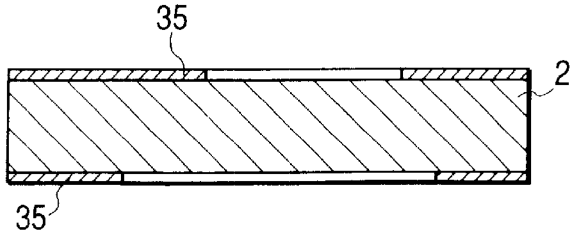
FIGS. 16A, 16B, 16C and 16D are views which illustrate a method for manufacturing the ceiling plate use for the liquid discharge head in accordance with the first embodiment of the present invention.

In FIG. 16A, an oxide film ($SiO_2$) 35 is formed on both faces of the silicon ceiling plate 2 in a thickness of approximately 1.0 μm. Then, this $SiO_2$ film 35 is patterned by means of known photolithographic process.

Figure 16B:
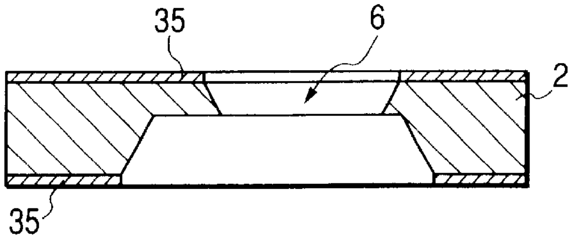

Then, as shown in FIG. 16B, the portion of the ceiling plate 2 which is not covered by the $SiO_2$ film 35 (that is, the portion corresponding to the common liquid supply chamber 6) is etched using TMAH (tetra methyl ammonium hydride) for the removal thereof, thus forming the common liquid supply chamber 6 on the ceiling plate 2 to supply liquid to a plurality of liquid supply ports 5 (see FIGS. 15A to 15C). In this respect, the etching is suspended at a proper time on the way of its progress to form the common liquid supply chamber 6 surrounded by the inclined wall faces as shown in FIG. 16B.

Figure 16C:
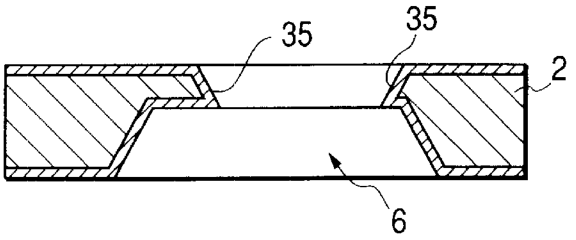

Next, as shown in FIG. 16C, the SiN film 35 which is a liquid erosion proof film is added to the surface of the ceiling plate 2 by means of LP-CVD method in a form to cover the etched surface (that is, the plane that surrounds the common liquid supply chamber).

Figure 16D:
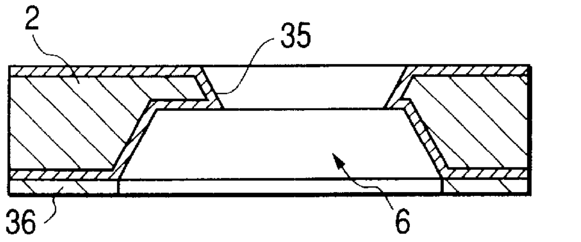

Next, as shown in FIG. 16D, the epoxy resin layer 36 is formed on the ceiling plate 2 on the bonding surface side to the element substrate 1 in a thickness of approximately 1 to 10 μm to serve as the bonding layer therefor.

As described above, the ceiling plate 2 provided with the common liquid supply chamber 6 is formed.

Figure 17A:
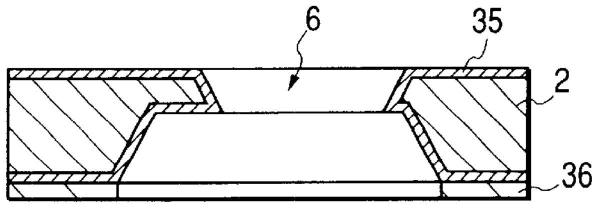
FIGS. 17A and 17B are views which illustrate the step of bonding the element substrate and the ceiling plate of the liquid discharge head in accordance with the first embodiment of the present invention.
Figure 17B:
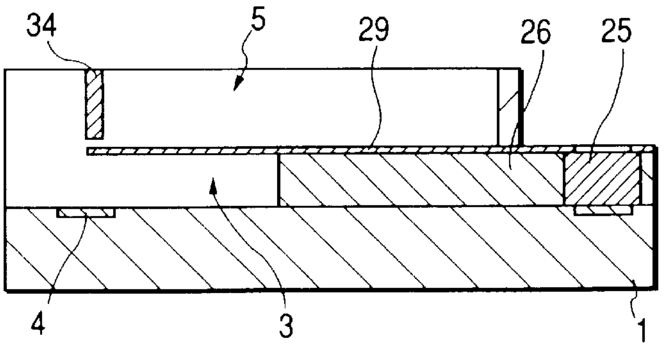
Figures 18A, 18B, 18C, 18D, 18E, 18F, 18G, 18H, 18I:
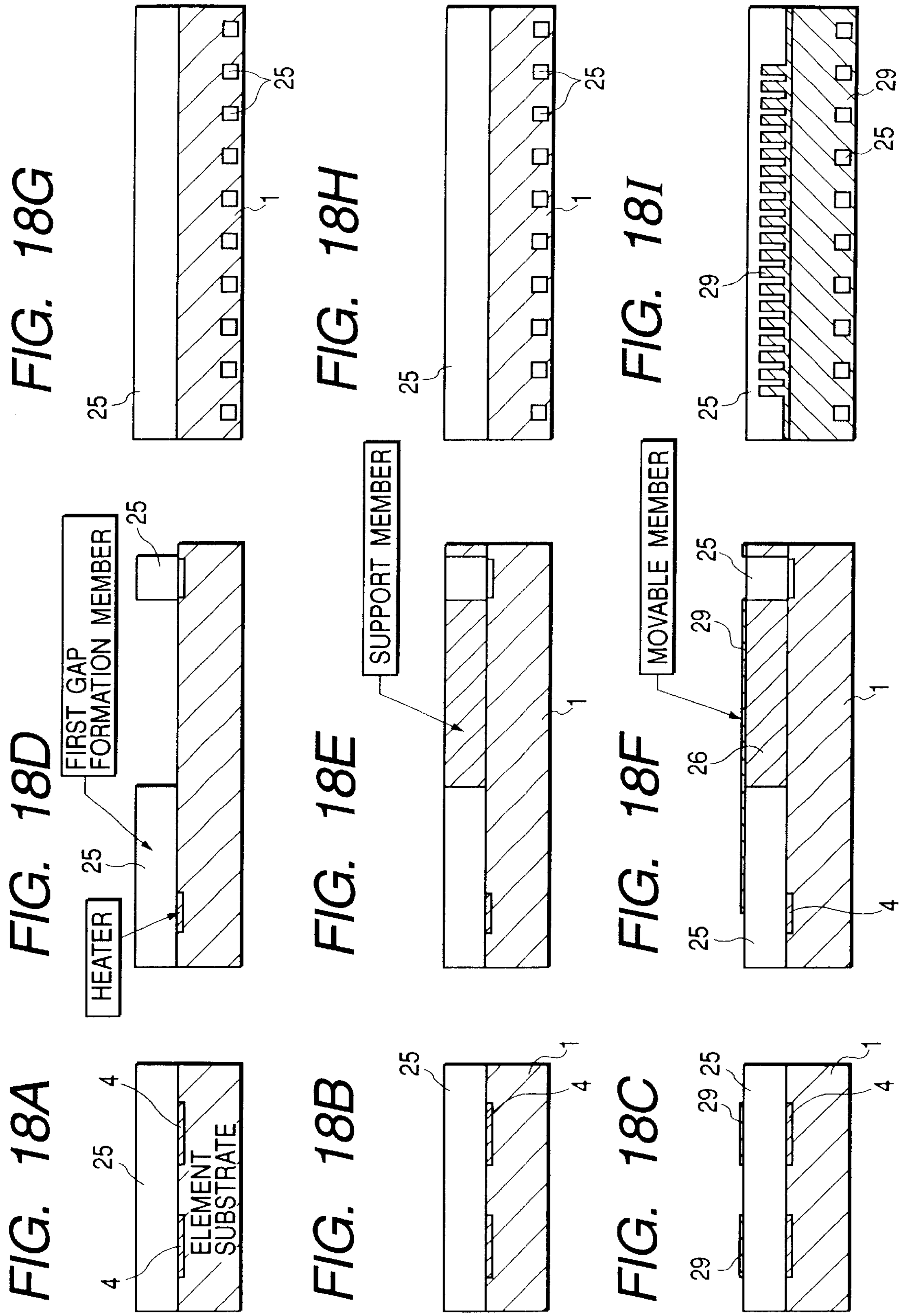
FIGS. 18A, 18B, 18C, 18D, 18E, 18F, 18G, 18H and 18I are views which illustrate the variational mode of the method for manufacturing the element substrate used for the liquid discharge head in accordance with the first embodiment of the present invention.

Now, as shown in FIGS. 17A and 17B, the ceiling plate 2 provided with the common liquid supply chamber 6 communicated with a plurality of liquid supply ports 5 is laminated on the element substrate 1 having the movable member 8, the liquid flow path walls 10, and the liquid supply ports 5 arranged thereon, and then, fixed after being heated and bonded under pressure. Further, the nozzle plate having discharge ports 7 is fixed on the edge portion of laminated body of element substrate 1 and the ceiling plate 2 in such a manner that each of discharge ports 7 faces each of the liquid flow paths 3, thus completing the liquid discharge head shown in FIG. 1 to FIG. 3.

(Variational Mode)

Now, with reference to FIG. 18A to FIG. 21C, the description will be made of the variational mode in accordance with the present embodiment. As understandable from the representation of FIGS. 13D, 13E, and 13F, the steps shown in FIG. 12A to FIG. 15C, in which the liquid flow path walls 10 and liquid supply port 5 are arranged for the movable member 8, provide the step of removing the mask used for patterning the TiW film that forms the second gap member (the second gap formation layer), which is separately executed from the step of removing the Al film pattern 25 that forms the first gap member becoming the liquid flow path 3. FIGS. 13D, 13E, and 13F illustrate the state before the Al film pattern 25, which forms the first gap member becoming the liquid flow path 3, is removed after the mask used for patterning the TiW film that forms the second gap member (the second gap formation layer) has been removed.

On the other hand, as described below in conjunction with FIGS. 19A, 19D, 19G, 20C, 20F, and 20I, the present embodiment adopts one and the same process for the step of removing the mask used for patterning the TiW film, and the step of removing the Al film pattern 25 for the formation of the first gap member that becomes the liquid flow path 3. This process differs those shown in FIG. 12A to FIG. 15C. The other processes of the present embodiment are the same as those of the embodiment shown in conjunction with FIGS. 12A to FIG. 15C. Here, FIGS. 18A to 18I and FIGS. 21A to 21C correspond to FIGS. 12A, 12D, 12G, 12C, 12F, 12I, FIG. 13A, FIG. 13D, FIG. 13G, and FIGS. 15A to 15C, respectively. Now, hereunder, the detailed description will be made of the present embodiment using the accompanying drawings.

Figures 19A, 19B, 19C, 19D, 19E, 19F, 19G, 19H, 19I:
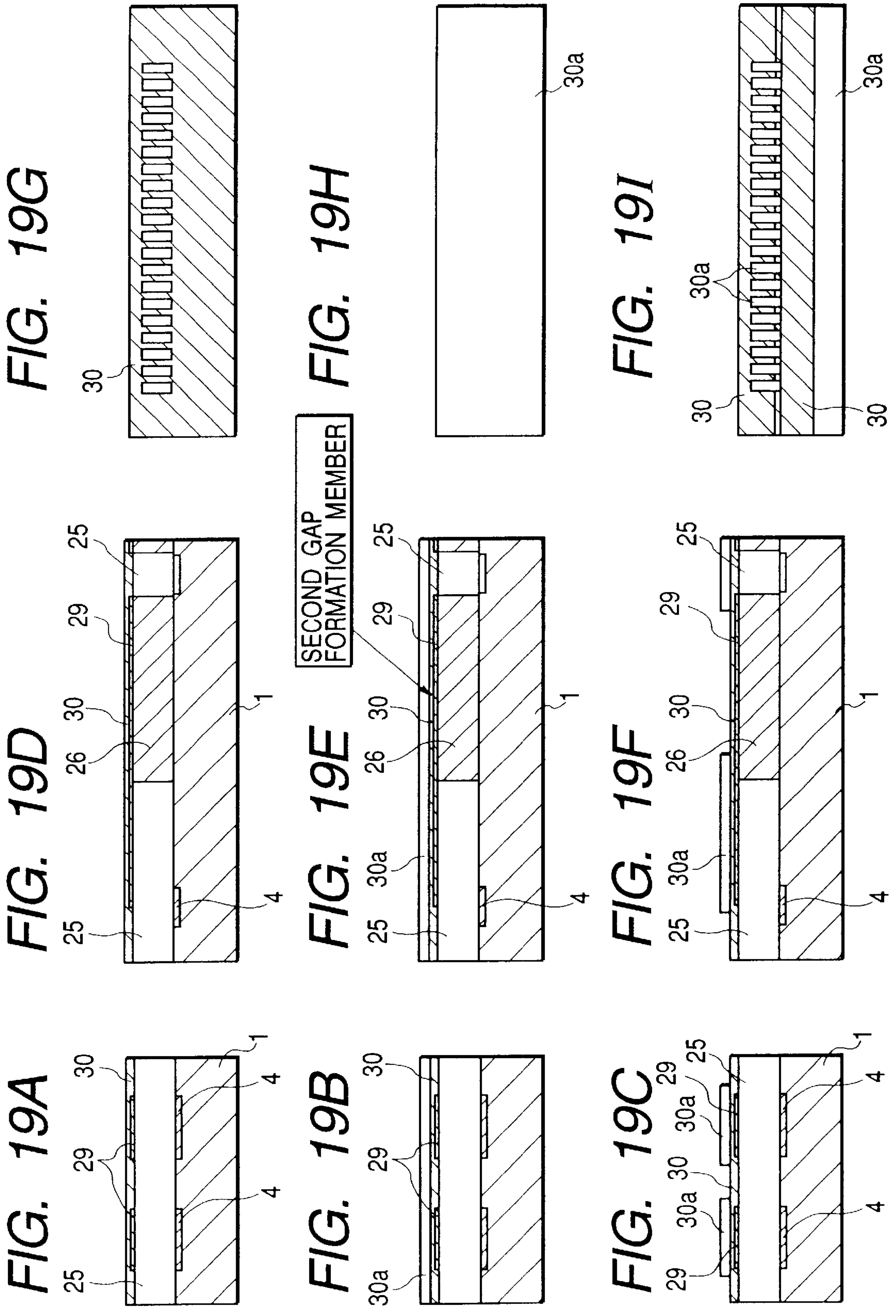
FIGS. 19A, 19B, 19C, 19D, 19E, 19F, 19G, 19H and 19I are views which illustrate the variational mode of the method for manufacturing the element substrate used for the liquid discharge head in accordance with the first embodiment of the present, and illustrates the step in continuation of the one shown in FIGS. 18A to 18I.
Figures 20A, 20B, 20C, 20D, 20E, 20F, 20G, 20H, 20I:
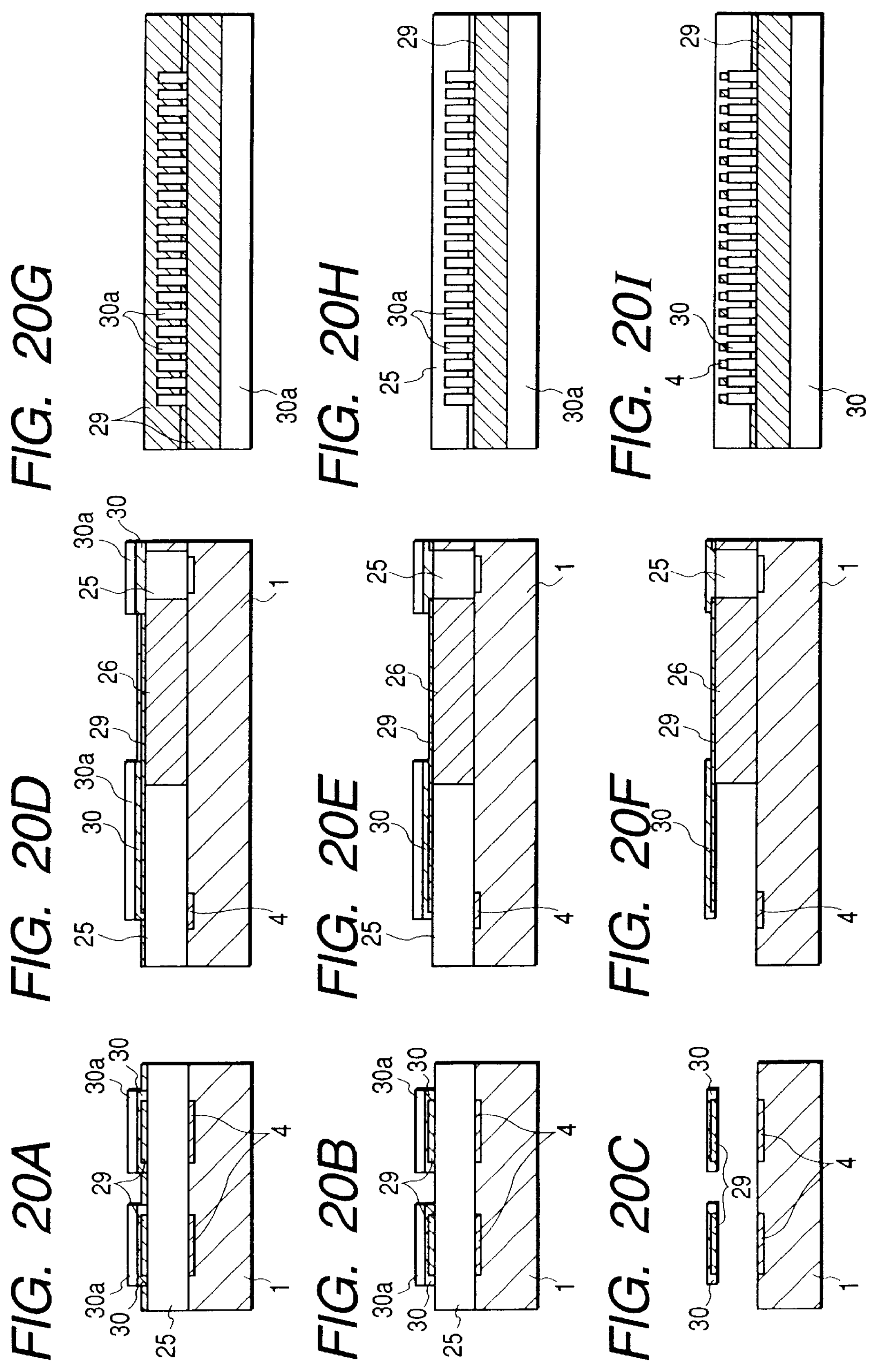
FIGS. 20A, 20B, 20C, 20D, 20E, 20F, 20G, 20H and 20I are views which illustrate the variational mode of the method for manufacturing the element substrate used for the liquid discharge head in accordance with the first embodiment of the present, and illustrates the step in continuation of the one shown in FIGS. 19A to 19I.
Figures 21A, 21B, 21C:
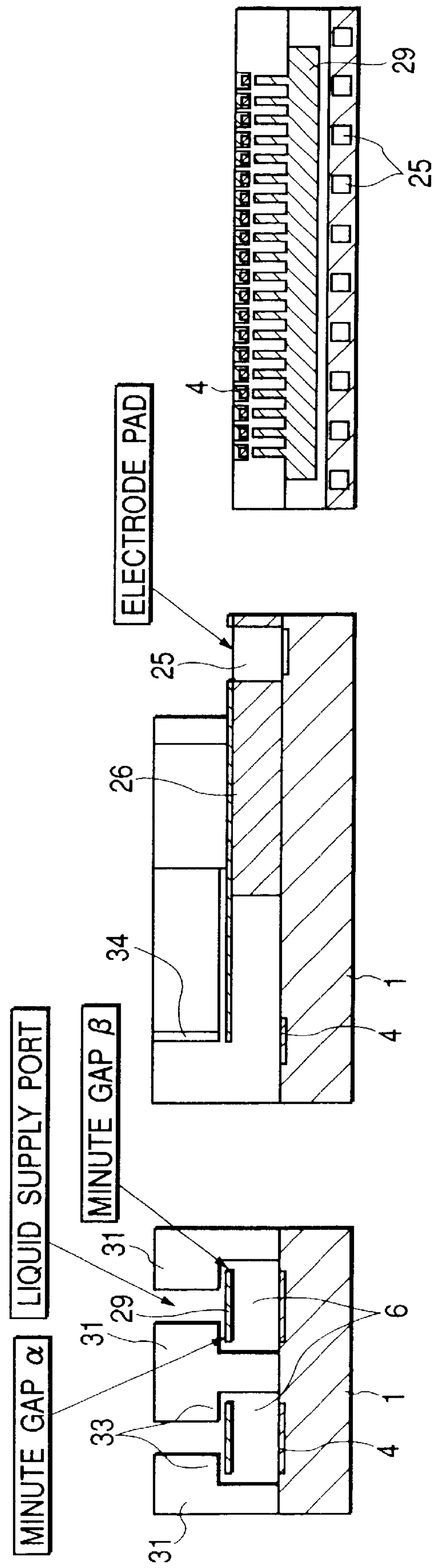
FIGS. 21A, 21B and 21C are views which illustrate the variational mode of the method for manufacturing the element substrate used for the liquid discharge head in accordance with the first embodiment of the present, and illustrates the step in continuation of the one shown in FIGS. 20A to 20I.

Subsequent to having formed the TiW (the second gap formation layer) by means of sputtering method in a thickness of approximately 3.0 μm to cover the SiN film 37 becoming the movable member (FIGS. 19A, 19D, and 19G), an aluminum film 30*a* is formed on the TiW film by means of sputtering method in a thickness of approximately 1.0 μm as shown in FIGS. 20B, 20E, and 20H, and patterned by use of known photolithographic process (FIGS. 19C, 19F, and 19I). Then, with the aluminum film 30*a* as mask material, the TiW film is etched up to approximately 2.5 μm by means of ICP etching method using gas seed of $SF_6$, $CF_4$, $C_2F_6$, $C_xF_y$, or the like (FIGS. 20A, 20D, and 20G).

After that, the remaining TiW film is etched up to approximately 0.5 μm by use of $H_2O_2$ solution (FIGS. 20A, 20D, and 20G).

Now, as shown in FIGS. 20C, 20F, and 20I, the Al film pattern 25 (the first gap formation member) on the portion becoming the liquid flow path 3, and the aluminum film 30*a* used for the mask layer to from the second gap formation member are completely removed altogether by means of hot etching using a mixed solution of acetic acid, phosphoric acid, and nitric acid.

Here, since the base layer of the TiW film has the aluminum film region and the SiN film region, which are present mixedly, dry etching and wet etching are used separately on two stages when etching the TiW film.

Fundamentally, it is desired to form pattern only by means of IPC etching using the gas seed, such $SF_6$, $CF_4$, $C_2F_6$, $C_xF_y$, but the SiN film region has a higher etching selection ratio against the aforesaid gas to make it difficult to determine the point at which the TiW film etching should terminate.

Here, also, only with the wet etching, the technique hereof should become an isotropic etching, hence making it difficult to control filming the movable member 8 precisely.

Therefore, in accordance with the present embodiment, the pattern is formed by the dry etching and wet etching as described above utilizing appropriately the respective advantages that each of them has for the mutual purpose.

For the present embodiment, one and the same process is adopted for the step of removing the mask layer 30*a* used for patterning the TiW film, and the step of removing the Al film pattern 25 that forms the first gap member becoming the liquid flow path 3. This contributes to reducing the number of steps for manufacturing the liquid discharge head at lower costs.

(Second Embodiment)

Hereinafter, the description will be made of a second embodiment where the mode of the element substrate that has the movable member 8, the liquid flow path walls 10, and the liquid supply port is different from the mode thereof described in the first embodiment. Here, in accordance with reference to FIGS. 22A to 22N, the manufacturing process of the element substrate will be described, which represents characteristically the present embodiment. In this respect, the same reference marks are applied to the same structure of the first embodiment, and the descriptions of the structure and the formation method therefor will be partly omitted.

Figure 22A:
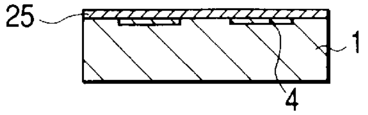
FIGS. 22A, 22B, 22C, 22D, 22E, 22F, 22G, 22H, 22I, 22J, 22K, 22L, 22M and 22N are views which illustrate a method for manufacturing the element substrate used of the liquid discharge head in accordance with a second embodiment of the present invention.
Figure 22B:
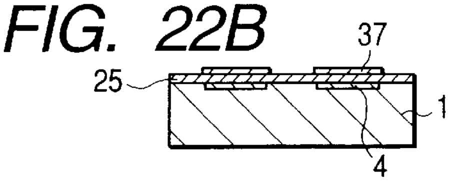
Figure 22C:
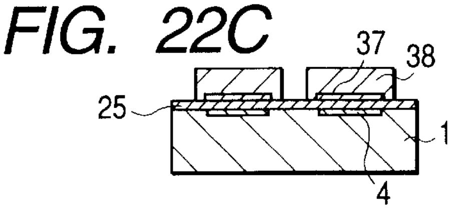
Figure 22D:
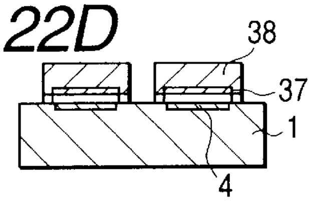
Figure 22E:
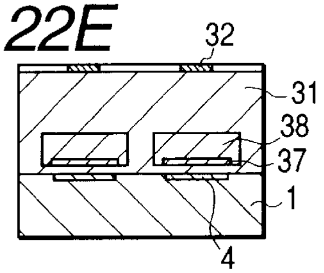
Figure 22F:
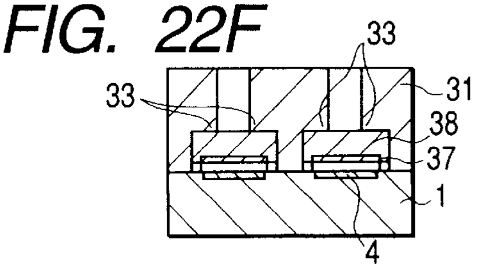
Figure 22G:
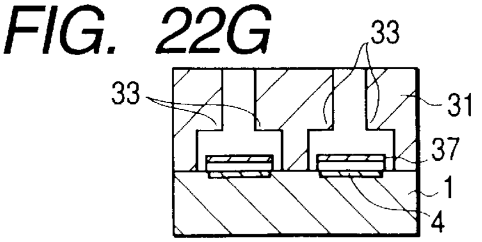
Figure 22H:
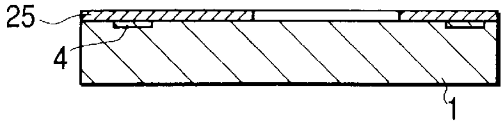

At first, as shown in FIGS. 22A and 22H, a TiW film (not shown) is formed by means of sputtering method on the plane of the element substrate 1 on the heat generating element 4 side in a thickness of approximately 5000 Å. Subsequently, the Al film (first gap formation layer) is formed by means of sputtering method in a thickness of approximately 5 μm. This Al film is patterned by use of known photolithographic process to form a plurality of Al film patterns 25 on the positions corresponding to the heat generating element 4 and electrode portion. Each of the Al film patterns 25 functions as the first gap formation member that forms the gap (regulate the gap) between the heat generating element 4 formed on the surface of the element substrate 1 and the movable member 8 to be described later. The TiW film (not shown) becomes the protection layer for the electrode portion.

Figure 22I:
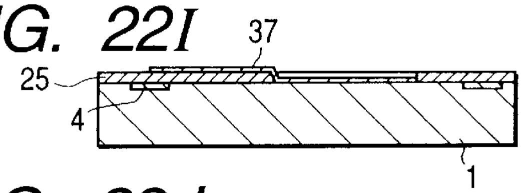

Then, as shown in FIGS. 22B and 22I, on the surface of the element substrate 1 and Al film pattern 25, the SiN film 37, which serves as material for the formation of the movable member 8, is formed by means of plasma CVD method in a thickness of approximately 5.0 μm. Then, the SiN film 37 thus formed is dry etched by use of an etching device using dielectric coupling plasma, thus leaving in tack the portion of the SiN film 37 that corresponds to the Al film pattern 25 becoming a part of the liquid flow path 3. Since this SiN film 37 is ultimately formed to be the movable member, the width of the liquid flow path 3 in the direction orthogonal to the flow path direction on the pattern of the SiN film 37 is made narrower than the width of the liquid flow path 3 which is ultimately formed. This movable member is formed by the movable portion that includes the free end, and the fixing portion which is bonded directly to the element substrate 1.

Figure 22J:
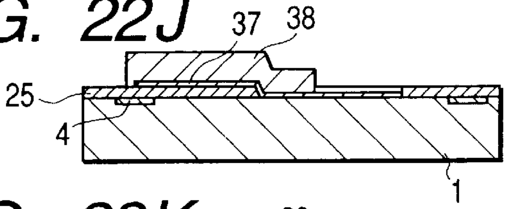

Next, as shown in FIGS. 22C and 22J, TiW film (second gap formation layer) is formed by means of sputtering method in a thickness of approximately 10.0 μm so as to cover the SiN film 37 which becomes the movable member. The TiW film is patterned by use of known photolithographic process to form the second gap formation member 38 locally on the surface and sides of the SiN film 37 for the formation of the gap α between the upper surface of the movable member and the liquid supply port 5, and the gap γ between both sides of the movable member and the flow path side walls 10.

Figure 22K:
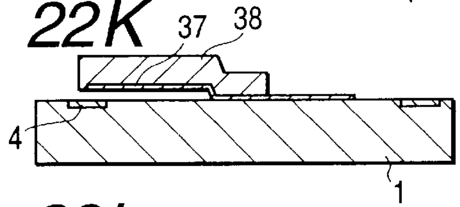
Figure 22L:
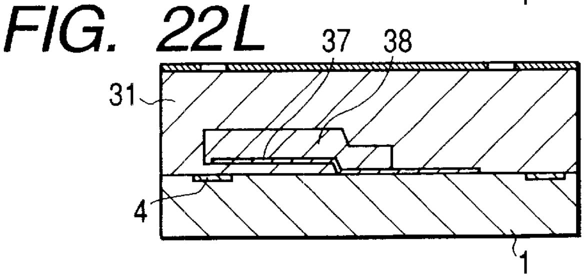

Next, as shown in FIGS. 22D and 22K, the portion of the Al film pattern 25 (the first gap formation member) that becomes the liquid flow paths 3 is completely removed by means of hot etching using a mixed solution of acetic acid, phosphoric acid, and nitric acid.

Next, an appropriate amount of negative type photosensitive epoxy resin 31, such as SU-8-50 (product name: manufactured by Microchemical Corporation), is dropped onto the element substrate 1, and spin-coated in a thickness of approximately 40 to 60 μm. Here, by the aforesaid spin-coating process, it is possible to coat photosensitive epoxy resin 31 smoothly to form the flow path side walls 10 on which the ceiling plate 2 is bonded. In continuation, on the same conditions as in the first embodiment (Table 1), hot plate is used to prebake the photosensitive epoxy resin 31 at 90° C. for 5 minutes. After that, as shown in FIGS. 22E and 22I, the mask pattern 32 is placed, and by use of an exposing device (Canon: MPA600), the photosensitive epoxy resin 31 is exposed with exposing light in a quantity of 2 [J/cm$^2$].

Figure 22M:
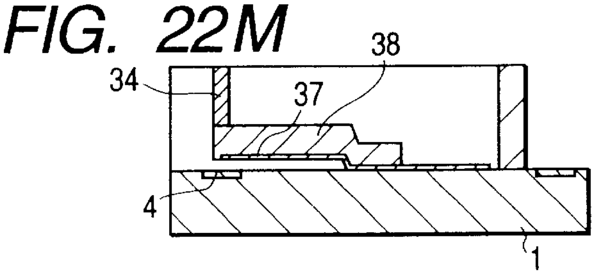
Figure 22N:
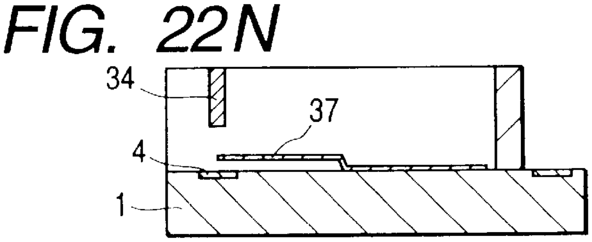

The exposed portion of the photosensitive epoxy resin 31 is hardened, while the portion which is not exposed is not hardened. Therefore, in the aforesaid exposing step, only the portion other than the portion that becomes the liquid supply port 5 is exposed. Here, the second gap formation member 38 is formed by the light shielding TiW film, and, therefore, it functions as the mask that does not allow the photosensitive epoxy resin 31 to be exposed when the resin flows into underneath. Then, as shown in FIGS. 22F, and 22M, using the developer, propylene glycol 1-monomethyl ether acetate (manufactured by Kishida Kagaku), the photosensitive epoxy resin 31 on the non-photosensitive portion (non-exposed portion) is removed. In this manner, the liquid supply port 5 is formed on the upper part of the second gap formation member 38 on the movable member which is shielded by the pattern mask 32, and then, the liquid flow path 3 is formed on the lower part of the movable member which is shielded by the second gap formation member 38 formed by the TiW film. Further, after that, the regular baking is made at 200° C. for one hour. In this respect, the area of the non-photosensitive portion (non-exposed portion) by use of the pattern mask 32 is smaller than the area of the non-photosensitive portion (non-exposed portion) by the presence of the second gap formation member 38. Therefore, the opening area for hole portion that becomes the liquid supply port 5 becomes smaller than the flat area of the liquid flow path 3. As a result, as shown in FIG. 22G, a step is created for the liquid flow side walls 10. This step becomes the side stopper 33 that regulates the displacement of the movable member. Here, the top end stopper 34 formed by the hardened portion of the photosensitive epoxy resin 31 is also the one that regulates the displacement of the movable member. Lastly, as shown in FIGS. 22G and 22N, the TiW film serving as the second gap formation member 38 is removed by means of hot etching using hydrogen peroxide.

As described above, the movable member 8, the liquid path side walls 10, and the liquid supply port 5 are formed on the element substrate 1.

After that, as in the first embodiment, the ceiling plate 2 provided with the common liquid supply chamber 6, and the nozzle plate having discharge ports 7 are bonded to complete the liquid discharge head.

The liquid discharge head manufactured in accordance with the present embodiment has the wider gap between the movable member and liquid supply port than the one that the first embodiment provides, and the structure thereof is such that the liquid flow path is not substantially closed with the exception of the discharge port when liquid is not bubbled.

(Variational Mode)

As understandable from the representation of FIGS. 22C and 22J, the steps shown in FIGS. 22A to 22N, in which the liquid flow path walls 10 and liquid supply port 5 are arranged for the movable member 8, provide the step of removing the mask used for patterning the TiW film that forms the second gap member (the second gap formation layer), which is separately executed from the step of removing the Al film pattern 25 that forms the first gap member becoming the liquid flow path 3. FIGS. 22C and 22J illustrate the state before the Al film pattern 25, which forms the first gap member becoming the liquid flow path 3, is removed after the mask used for patterning the TiW film that forms the second gap member (the second gap formation layer) has been removed.

On the other hand, as described below, the present embodiment adopts one and the same process for the step of removing the mask used for patterning the TiW film, and the step of removing the Al film pattern 25 for the formation of the first gap member that becomes the liquid flow path 3. This process differs those shown in FIGS. 22A to 22N. The other processes of the present embodiment are the same as those shown in FIGS. 22A to 22N.

Subsequent to having formed the TiW film (the second gap formation layer) by means of sputtering method in a thickness of approximately 10.0 μm to cover the SiN film 37 becoming the movable member, an aluminum film 30*a* is formed on the TiW film by means of sputtering method in a thickness of approximately 1.0 μm, and patterned by use of known photolithographic process. Then, with the aluminum film 30*a* as mask material, the TiW film is etched up to approximately 9.0 μm by means of ICP etching method using gas seed of $SF_6$, $CF_4$, $C_2F_6$, $C_xF_y$, or the like.

After that, the remaining TiW film is etched up to approximately 1.0 μm by use of $H_2O_2$ solution.

Now, the Al film pattern 25 (the first gap formation member) on the portion becoming the liquid flow path 3, and the aluminum film used for the mask layer to from the second gap formation member are completely removed altogether by means of hot etching using a mixed solution of acetic acid, phosphoric acid, and nitric acid.

Here, since the base layer of the TiW film has the aluminum film region and the SiN film region, which are present mixedly as in the first embodiment, dry etching and wet etching are used separately on two stages when etching the TiW film.

For the present embodiment, one and the same process is adopted for the step of removing the mask layer used for patterning the TiW film, and the step of removing the Al film pattern 25 that forms the first gap member becoming the liquid flow path 3. This contributes to reducing the number of steps for manufacturing the liquid discharge head at lower costs.

(Third Embodiment)

Figure 23:
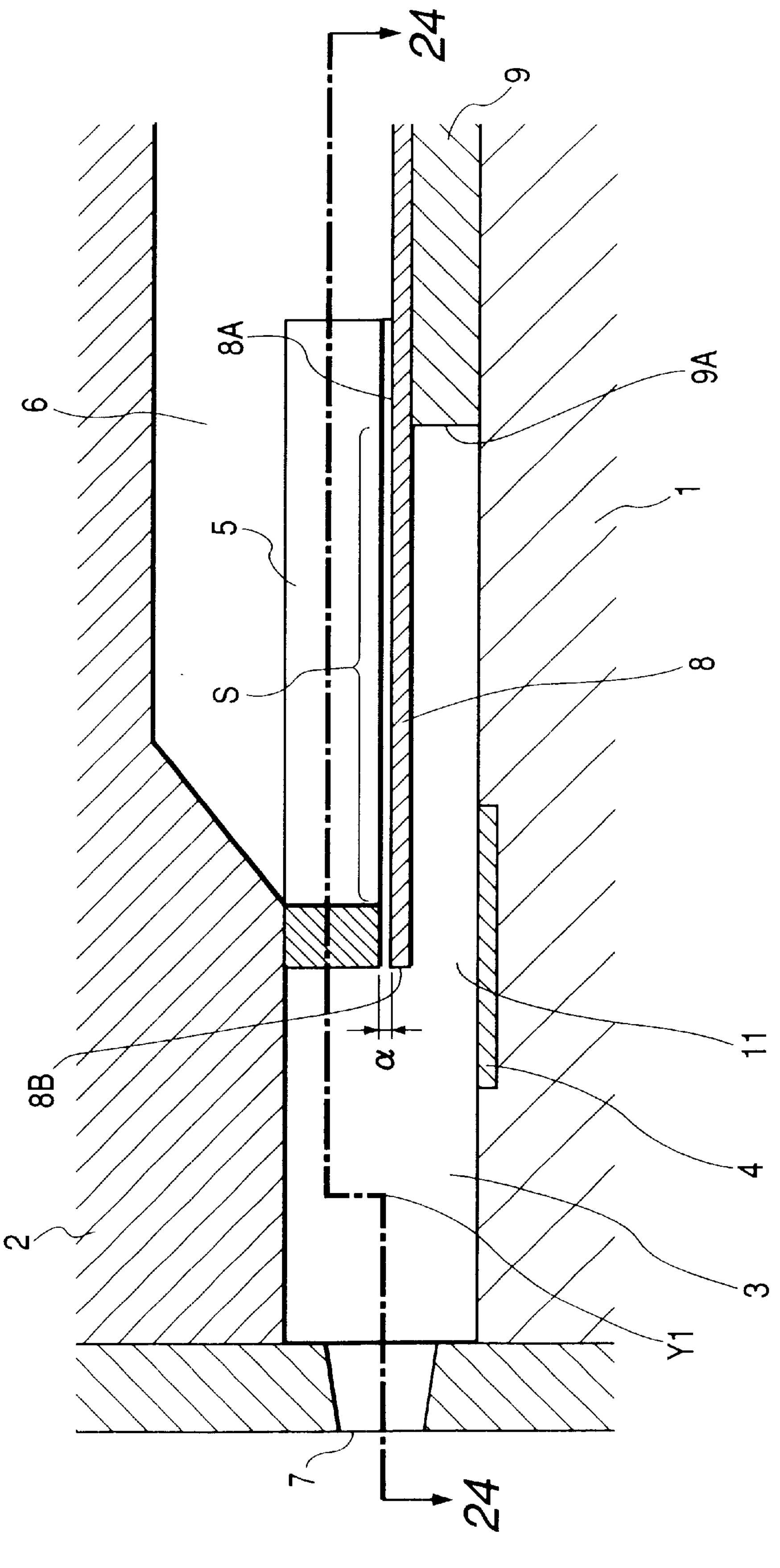
FIG. 23 is a cross-sectional view which shows a first variational example of the liquid discharge head in accordance with a third embodiment of the present invention, taken in the direction of one liquid flow path.
Figure 24:
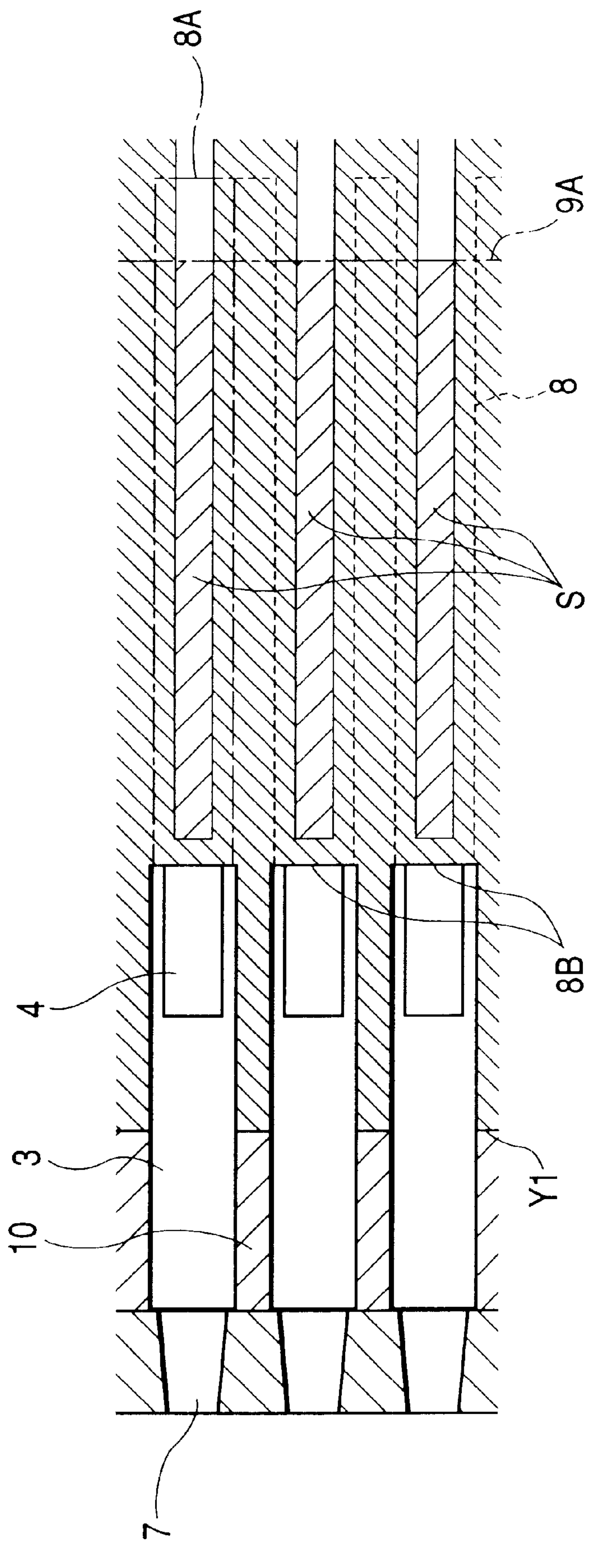
FIG. 24 is a cross-sectional view taken along line 24—24 in FIG. 23.
Figure 25D:
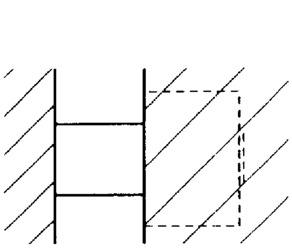
FIGS. 25A, 25B, 25C and 25D are views which show a liquid discharge head in accordance with a fourth embodiment of the present invention.
Figure 25C:
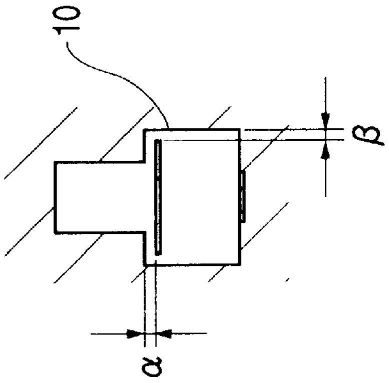
Figure 25A:
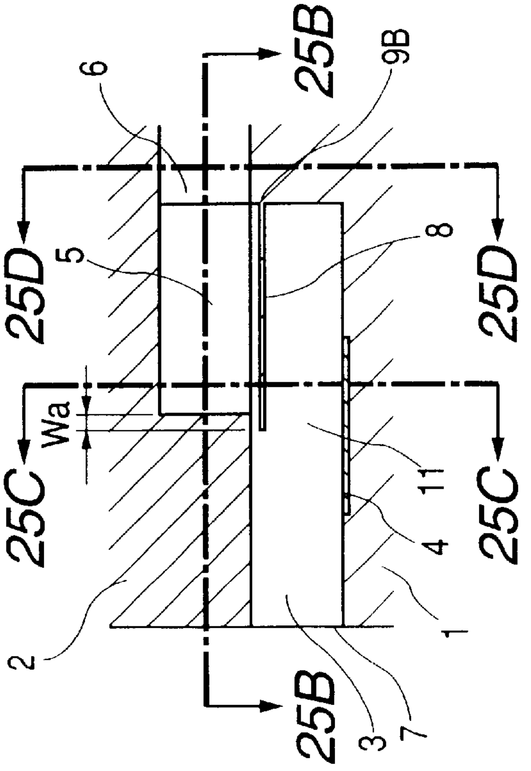
Figure 25B:
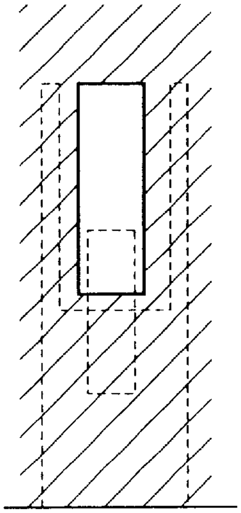

For the head structure of the first embodiment, the liquid supply port 5 is an opening surrounded by four wall faces as shown in FIG. 3. However, of the supply unit formation member 5A (see FIG. 1), it may be possible to release the wall face on the liquid supply chamber 6 side which is opposite to the discharge port 7 side as in the mode illustrated in FIG. 23 and FIG. 24. In the case of this mode, the opening area S becomes the area surrounded by the three sides of the liquid supply port 5 and the edge portion 9A of the fixing member 9 as shown in FIG. 23 and FIG. 24 as in the first embodiment.

(Fourth Embodiment)

Now, with reference to FIGS. 25A to 25D, the description will be made of the liquid discharge head in accordance with a fourth embodiment of the present invention.

In the mode of the liquid discharge head shown in FIGS. 25A to 25D, the element substrate 1 and the ceiling plate 2 are bonded, and between these two plates 1 and 2, the liquid flow path 3 is formed, one end of which is communicated with the discharge port 7 and the other, closed.

For the liquid flow path 3, the liquid supply port 5 is arranged, and also, the common liquid supply chamber 6, which is communicated with the liquid supply port 5, is arranged.

Between the liquid supply port 5 and the liquid flow path 3, the movable member 8 is arranged almost in parallel to the opening area of the liquid supply port 5 with a minute gap α (10 μm or less). The area of the movable member 8, which is surrounded at least by the free end portion and both side portions which are continued thereto, is made larger than the opening area S of the liquid supply port 5 to the liquid flow path. Further, there is a minute gap β between the sides of the movable member 8 and the liquid flow path walls 10. In this manner, while the movable member 8 moves in the liquid flow path 3 without frictional resistance, the displacement thereof to the opening area side is regulated by the circumference of the opening area S. Thus, the liquid supply port 5 is essentially closed to make it possible to prevent liquid flow from the liquid flow path 3 to the common liquid supply chamber 6. Also, in accordance with the present embodiment, the movable member 8 is positioned to face the element substrate 1. Then, one end of the movable member 8 becomes the free end thereof which is displaced to the element substrate 1 on the heat generating element 4 side, and the other end side is supported by the supporting member 9B.

(Other Embodiments)

Hereinafter, the description will be made of various embodiments preferably suitable for the head that uses the principle of liquid discharge of the present invention.

(Side Shooter Type)

Figure 26:
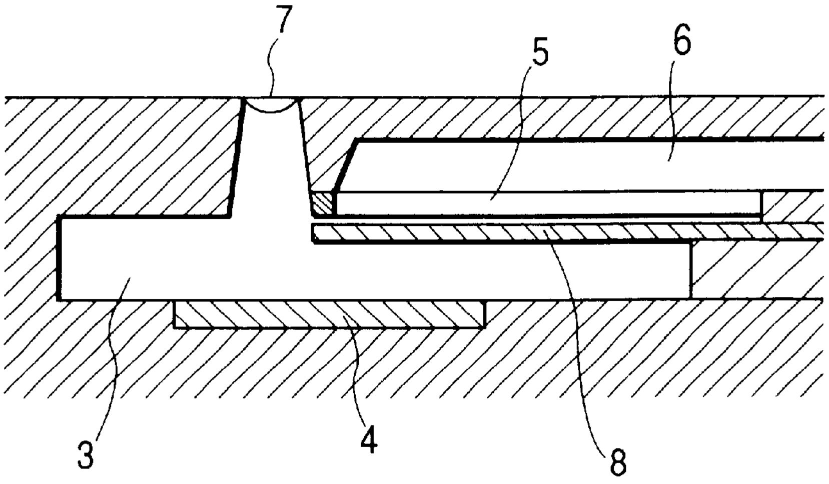
FIG. 26 is a view which illustrates the example of the head of side shooter type to which a liquid discharge method of the present invention is applicable.

FIG. 26 is a cross-sectional view which shows a liquid discharge head of the so-called side shooter type. For the description thereof, the same reference marks are applied to the same constitutes appearing in the first embodiment. The liquid discharge head of this mode is different from the one shown in the first embodiment in that as shown in FIG. 26, the heat generating element 4 and the discharge port 7 are arranged to face each other on the parallel planes, and that the liquid flow path 3 is communicated with the discharge port 7 at right angles to the axial direction of liquid discharge to be made from the discharge port. A liquid discharge head of the kind is also capable of demonstrating the effect based upon the same discharge principle described in the first embodiment. Also, the method of manufacture described in accordance with the first embodiment is easily applicable to the head of the kind.

(Movable Member)

For each of the embodiments described above, the material that forms the movable member should be good enough if only it has resistance to solvent with respect to discharge liquid, as well as the elasticity that facilities the operation of the movable member in good condition.

As the material of the movable member, it is preferable to use a highly durable metal, such as silver, nickel, gold, iron, titanium, aluminum, platinum, tantalum, stainless steel, phosphor bronze, and alloys thereof; or resin of nitrile group, such as acrylonitrile, butadiene, styrene; resin of amide group, such as polyamide; resin of carboxyl group, such as polycarbonate; resin of aldehyde group, such as polyacetal; resin of sulfone group, such as polysulfone; and liquid crystal polymer or other resin and the compounds thereof; a highly ink resistive metal, such as gold, tungsten, tantalum, nickel, stainless steel, titanium; and regarding the alloys thereof and resistance to ink, those having any one of them coated on the surface thereof or resin of amide group, such as polyamide, resin of aldehyde group, such as polyacetal, resin of ketone group, such as polyether etherketone, resin of imide group, such as poly-imide, hydroxyl group, such as phenol resin, resin of ethyl group, such as polyethylene, resin of alkyl group, such as polypropylene, resin of epoxy group, such as epoxy resin, resin of amino group, such as melamine resin, resin of methyrol group, such as xylene resin and the compound thereof; further, ceramics of silicon dioxide, silicon nitride, or the like, and the compound thereof. Here, the target thickness of the movable member of the present invention is of μm order.

Now, the arrangement relations between the heat generating member and movable member will be described. With the optimal arrangement of the heat generating element and the movable member, it becomes possible to control and utilize the liquid flow appropriately when bubbling is effected by use of the heat generating element.

Figure 27:
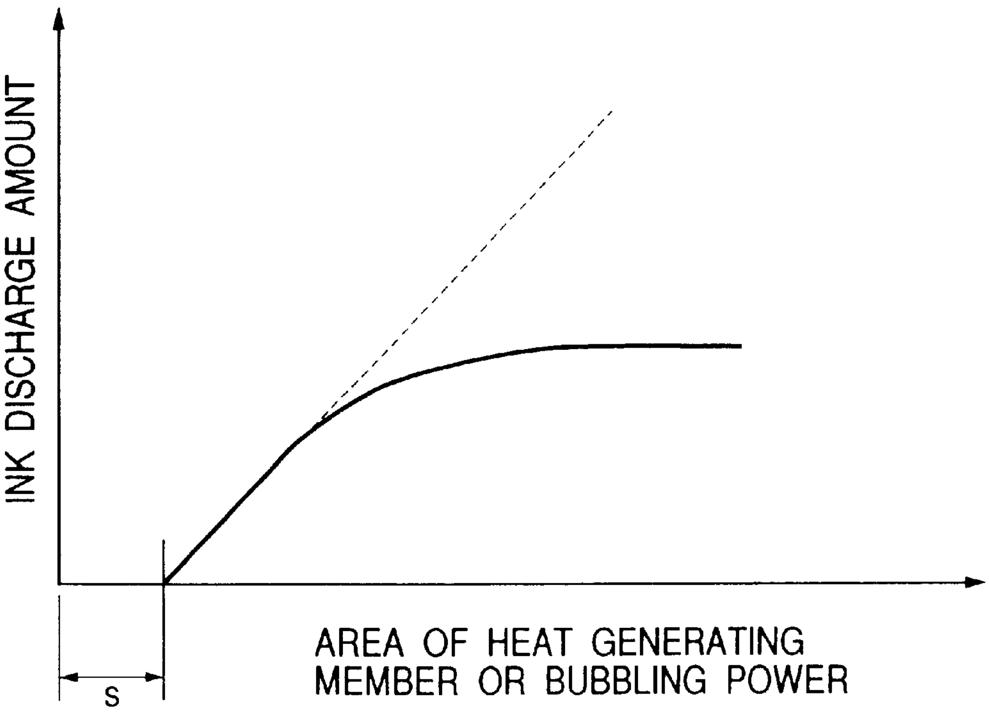
FIG. 27 is a graph which shows the relationship between the area of heat generating element and the amount of ink discharges.

For the conventional art of the so-called bubble jet recording method, that is, an ink jet recording method whereby to apply heat or other energy to ink to create change of states in it, which is accompanied by the abrupt voluminal changes (creation of the bubble), and then, use of the acting force based upon this change of states, ink is discharged from the discharge port to a recording medium for the formation of images thereon by the adhesion of ink thus discharged, the area of the heat generating element and the discharge amount of ink maintain the proportional relationship as indicated by slanted lines in FIG. 27. However, it is readily understandable that there exists the area S where no bubbling occurs, and no contribution is made to ink discharges. Also, from the burning condition on the heat generating element, this area S where no bubbling is occurs is present on the circumference of the heat generating element. With these resultant conditions in view, it is assumed that the circumference of the heat generating element in a width of approximately 4 μm does not participate in bubbling. On the other hand, for the liquid discharge head of the present invention, the liquid flow path that includes the bubble generating means is essentially covered with the exception of the discharge port so that the maximum discharge amount is regulated. Therefore, as indicated by a solid line in FIG. 27, there is the area where no discharge amount is caused to change even when the fluctuations are large with respect to the area of heat generating element, and bubbling power as well. With the utilization of such area as indicated by the solid line, it is possible to attempt the stabilization of discharge amount for dots in larger size.

(Element Substrate)

Hereunder, the description will be made of the structure of the element substrate 1 provided with the heat generating elements 10 for giving heat to liquid.

Figure 28A:
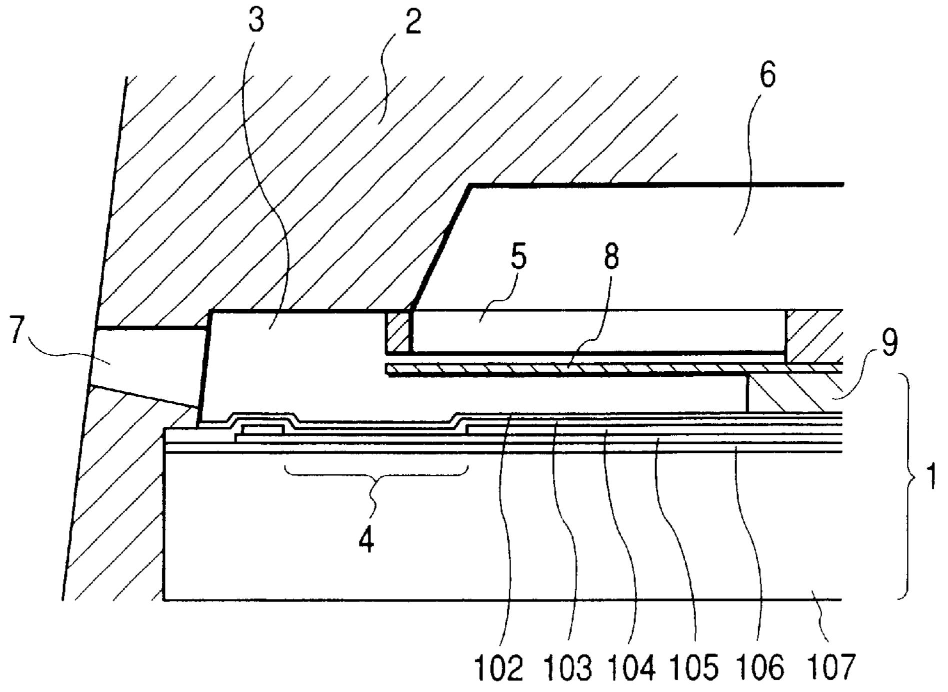
FIGS. 28A and 28B are vertically sectional views which illustrate a liquid discharge head in accordance with the present invention.
Figure 28B:
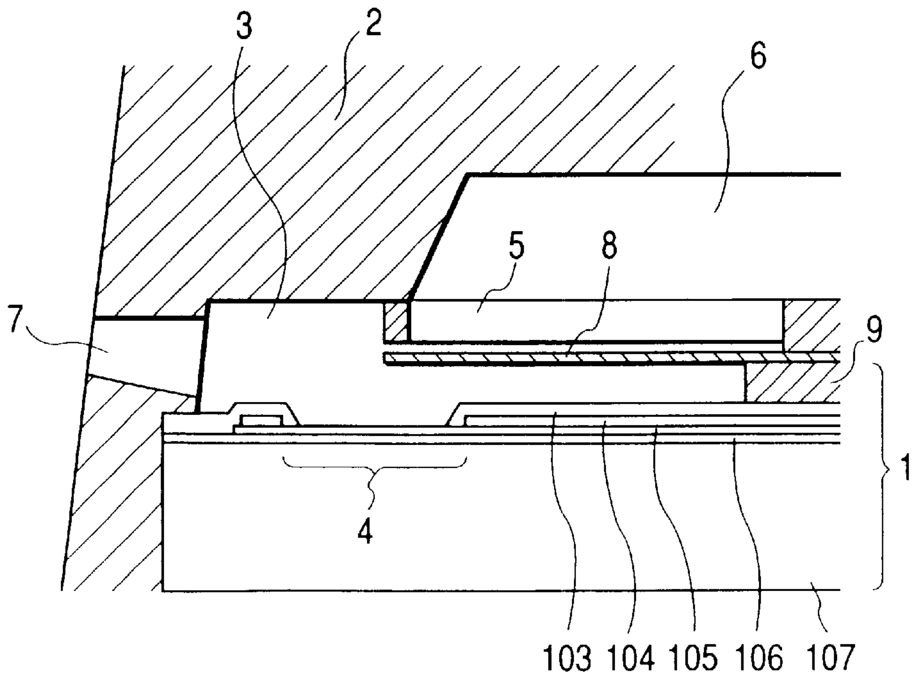

FIGS. 28A and 28B are side sectional views which illustrate the principal part of a liquid discharge apparatus in accordance with the present invention. FIG. 28A shows a head having a protection film to be described later. FIG. 28B shows a head without any protection film.

On the element substrate 1, the ceiling plate 2 is arranged, and the liquid flow path 3 is formed between the element substrate 1 and the ceiling plate 2.

For the element substrate 1, silicon oxide film or silicon nitride film 106 is filmed on a substrate 107 of silicon or the like for the purpose of making insulation and heat accumulation. On this film, there are patterned as shown in FIG. 28A an electric resistive layer 105 of halfniumboride ($HfB_2$), tantalum nitride (TaN), tantalum aluminum (TaAl), or the like, which structures the heat generating element 10 (in a thickness of 0.01 to 0.2 μm), and the wiring electrodes 104 of aluminum or the like (in a thickness of 0.2 to 1.0 μm). Voltage is applied from the wiring electrode 104 to the resistive layer 105 so as to enable electric current to run through the resistive layer 105 for heat generation. On the resistive layer 105 between the wiring electrodes 104, the protection layer 103 of silicon oxide, silicon nitride, or the like is formed in a thickness of 0.1 to 2.0 μm. Further on this layer, the cavitation proof layer 102 of tantalum or the like is filmed (in a thickness of 0.1 to 0.6 μm), hence protecting the resistive layer 105 from various kinds of liquid such as ink.

The pressure and shock waves become intensified particularly at the time of bubbling or bubble extinction, which may cause the durability of oxide films, which are hard but brittle, to be deteriorated significantly. To counteract this, a metallic material, such as tantalum (Ta), is used as the cavitation proof layer 102.

Also, by the combination of liquid, the flow path structure, and resistive materials, it may be possible to arrange a structure which does not need the protection film 103 for the aforesaid resistive layer 105. The example of such structure is shown in FIG. 28B. An alloy of iridium-tantalum-aluminum or the like may be cited as a material of the resistive layer 105 that requires no protection film 103.

As described above, it may be possible to arrange only the resistive layer 105 (heat generating portion) between the electrodes 104 to form the structure of the heat generating element 4 for each of the embodiments described earlier. Here, also, it may be possible to arrange the structure so that a protection film 103 is included for the protection of the resistive layer 105.

For each of the embodiments, the structure is arranged with the heat generating portion formed by the resistive layer 105 which generates heat as the heat generating element 4 in accordance with electric signals, but the heat generating element is not necessarily limited thereto. Any heat generating element may be adoptable if only it can create the bubble in bubbling liquid sufficiently so as to discharge discharging liquid. For example, such element may be an opto-thermal converting member that generates heat when receiving laser or some other light or the member which is provided with a heat generating portion that generates heat when receiving high frequency.

In this respect, on the aforesaid element substrate 1, functional devices, such as transistors, diodes, latches, shift registers, and others, which are needed to drive the heat generating elements 10 (electrothermal converting devices) selectively, may be integrally incorporated by use of the semiconductor manufacturing processes, besides the resistive layer 105 that constitutes the heat generating portion, and each heat generating element 4 formed by the wiring electrodes 104 to supply electric signals to the resistive layer 105.

Figure 29:
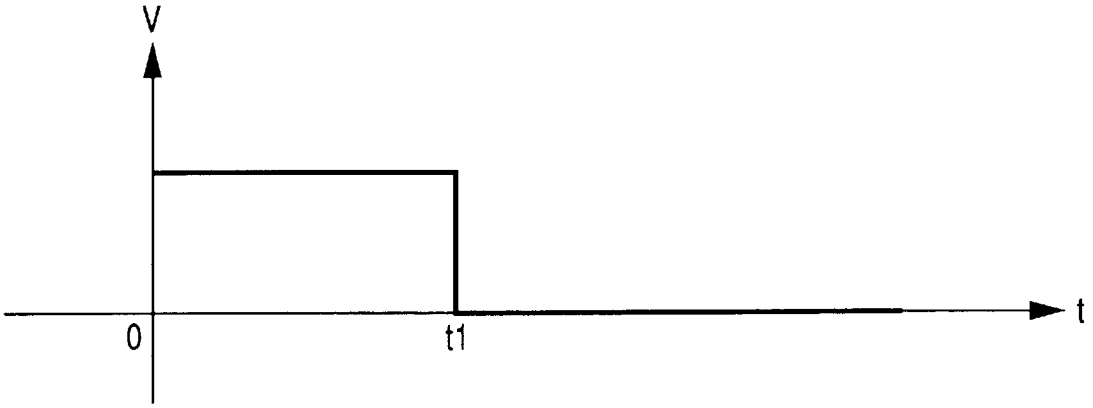
FIG. 29 is a view which shows the wave from for driving the heat generating element used for the present invention.

Also, in order to discharge liquid by driving the heat generating portion of each heat generating element 4 installed on the aforesaid elemental base plate 1, such rectangular pulses as shown in FIG. 29 are applied to the resistive layer 105 through the wiring electrodes 104 so as to enable the resistive layer 105 between the wiring electrodes 104 to be heated abruptly. For each head of the embodiments described earlier, the heat generating element is driven by the application of electric signals at 6 kHz, each having a voltage of 24 V in the pulse width of 7 μsec with electric current of 150 mA. With the operation described above, ink which is liquid is discharged from each discharge port 7. However, the condition of driving signals is not necessarily limited thereto, but any driving signals may be adoptable if only bubbling liquid should be bubbled appropriately by the application thereof.

(Discharging Liquid)

Of such liquids as described earlier, it is possible to use ink having the same compositions as the one used for the conventional bubble jet apparatus as liquid usable for recording (recording liquid).

However, as the characteristics of discharging liquid, it is desirable to use the one which does not impede by itself discharging, bubbling, or the operation of movable member.

As the discharging liquid for recording use, highly viscous ink or the like can be used, too.

Further, for the present invention, ink of the following composition is used as the recording liquid that can be adopted as discharging liquid. However, with the enhanced discharging power which in turn makes ink discharge speed faster, the displacement accuracy of liquid droplets is improved to obtain recorded images in extremely fine quality.

TABLE 2

| | | |
|---|---|---|
| Dyestuff ink | (C.I. food black 2) dyestuffs | 3 wt % |
| viscosity 2cP | diethylene glycol | 10 wt % |
| | thiodiglycol | 5 wt % |
| | ethanol | 3 wt % |
| | water | 77 wt % |

(Liquid Discharge Apparatus)

Figure 30:
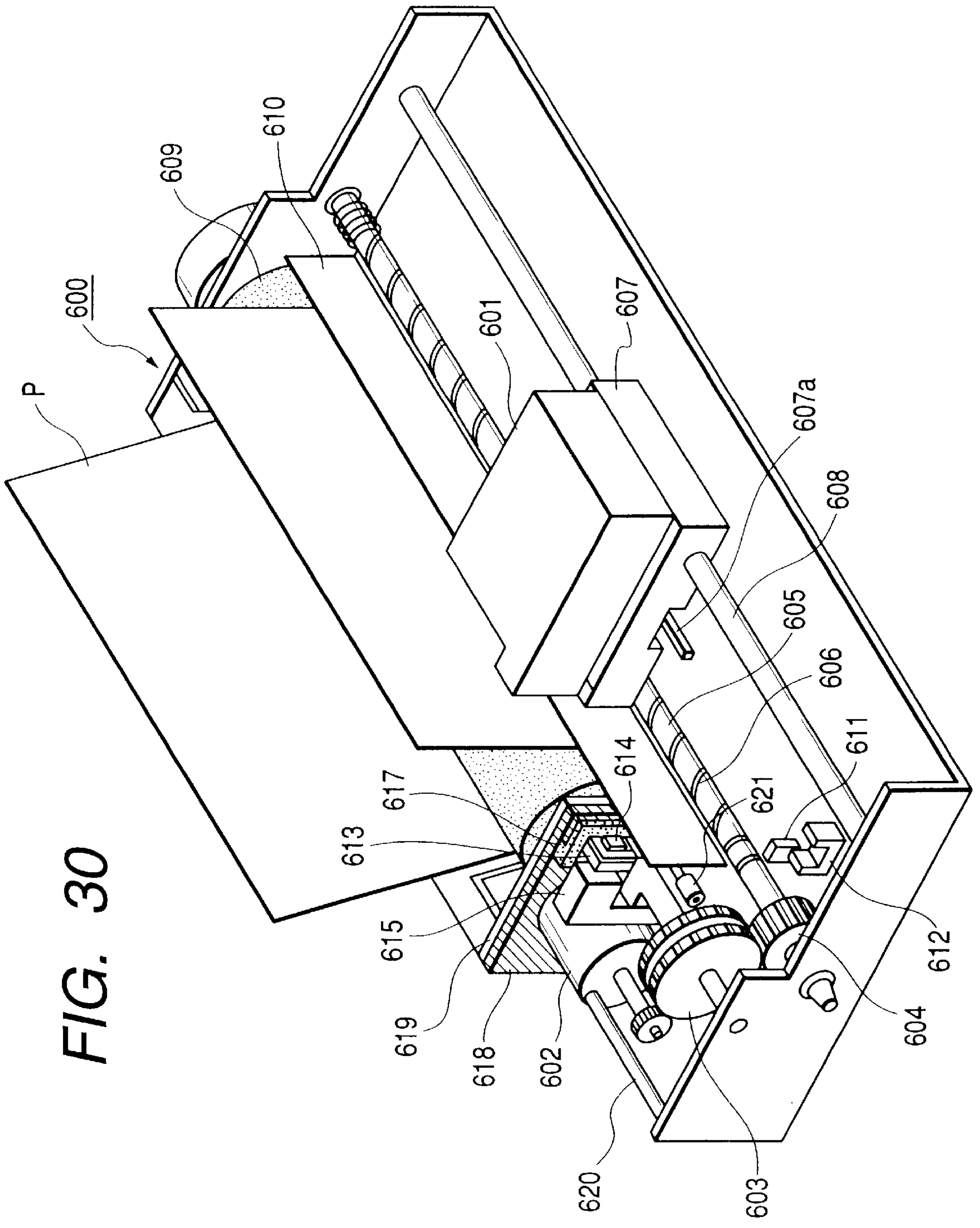
FIG. 30 is a view which shows schematically shows the structure of a liquid discharge apparatus having the liquid discharge head of the present invention mounted thereon.

FIG. 30 is a view which schematically shows the structure of an ink jet recording apparatus which is one example of the liquid discharge apparatus capable of installing thereon for application the liquid discharge head described in accordance with each of the above embodiments. The head cartridge 601 installed on an ink jet recording apparatus 600 shown in FIG. 30 is provided with the liquid discharge head structured as described above, and the liquid container that contains liquid to be supplied to the liquid discharge head. As shown in FIG. 30, the head cartridge 601 is mounted on the carriage 607 that engages with the spiral groove 606 of a lead screw 605 rotating through driving power transmission gears 603 and 604 which are interlocked with the regular and reverse rotations of a driving motor 602. The head cartridge 601 reciprocates by the driving power of the driving motor 602 together with the carriage 607 along a guide 608 in the directions indicated by arrows a and b. The ink jet recording apparatus 600 is provided with recording medium carrying means (not shown) for carrying a printing sheet P serving as the recording medium that receives liquid, such as ink, discharged from the head cartridge 601. Then, the sheet pressure plate 610, which is used for carrying the printing sheet P on a platen 609 by means for carrying recording medium, is arranged to press the printing sheet P to the platen 609 over the traveling direction of the carriage 607.

Photocouplers 611 and 612 are arranged in the vicinity of one end of the lead screw 605. The photocouplers 611 and 612 are the means for detecting home position which switches the rotational directions of the driving motor 602 by recognizing the presence of the lever 607*a* of the carriage 607 in the working region of the photocouplers 611 and 612. In the vicinity of one end of the platen 609, a supporting member 613 is arranged for supporting the cap member 614 that covers the front end having the discharge ports of the head cartridge 601. Also, there is arranged the ink suction means 615 that sucks ink retained in the interior of the cap member 614 when idle discharges or the like are made from the head cartridge 601. With the ink suction means 615, suction recoveries of the head cartridge 601 are performed through the opening portion of the cap member 614.

For the ink jet recording apparatus 600, a main body supporting member 619 is provided. For this main body supporting member 619, a movable member 618 is movably supported in the forward and backward directions, that is, the direction at right angles to the traveling directions of the carriage 607. On the movable member 618, a cleaning blade 617 is installed. The mode of the cleaning blade 617 is not necessarily limited to this arrangement. Any known cleaning blade of some other modes may be applicable. Further, there is provided the lever 620 which initiates suction when the ink suction means 615 operates its suction recovery. The lever 620 moves along the movement of the cam 621 that engages with the carriage 607. The movement thereof is controlled by known transmission means such as the clutch that switches the driving power of the driving motor 602. The ink jet recording controller, which deals with the supply of signals to the heat generating elements provided for the head cartridge 601, as well as the driving controls of each of the mechanisms described earlier, is provided for the recording apparatus main body side, and not shown in FIG. 31.

For the ink jet recording apparatus 600 structured as described above, the aforesaid recording medium carrying means carries a printing sheet P on the platen 609, and the head cartridge 601 reciprocates over the entire width of the printing sheet P. During this reciprocation, ink (recording liquid) is discharged from the liquid discharge head unit to the recording medium in accordance with the driving signals for recording when driving signals are supplied to the head cartridge 601 from driving signal supply means (not shown).

Figure 31:
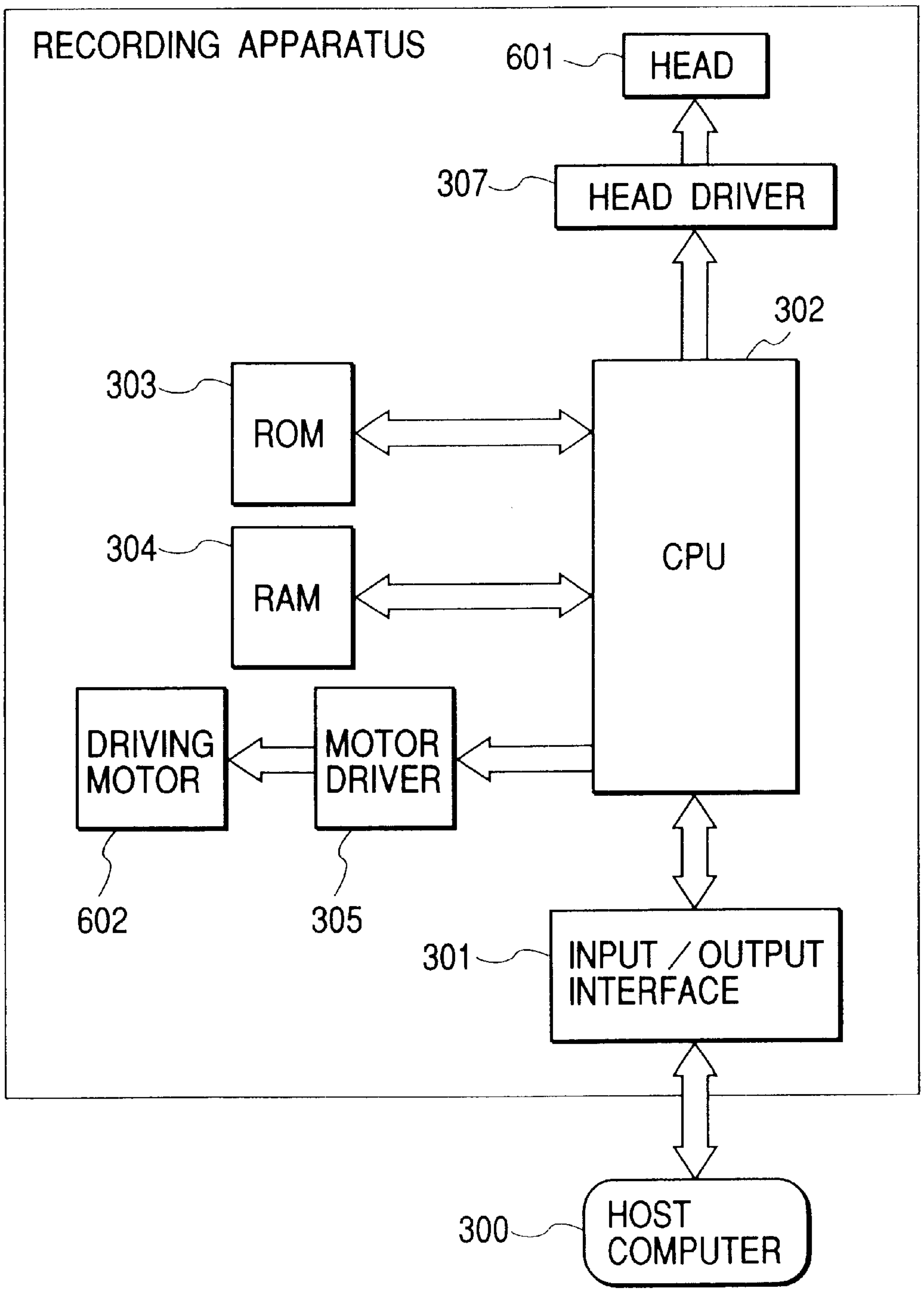
FIG. 31 is a block diagram which shows the entire body of an apparatus for recording by discharging liquid with the liquid discharge method and liquid discharge head of the present invention.

FIG. 31 is a block diagram which shows the entire body of a recording apparatus for executing the ink jet recording by use of the liquid discharge apparatus of the present invention.

The recording apparatus receives printing information from a host computer 300 as control signals. The printing information is provisionally stored on the input interface 301 in the interior of a printing apparatus, and at the same time, converted into the data processible in the recording apparatus, thus being inputted into the CPU (central processing unit) 302 that dually functions as head driving signal supply means. The CPU 302 processes the data thus received by the CPU 302 using RAM (random access memory) 304 and other peripheral units in accordance with the control program stored on ROM (read only memory) 303, and convert them into the data (image data) for printing.

Also, the CPU 302 produces the driving data which are used for driving the driving motor 602 for carrying the recording sheet and the carriage 607 to travel together with the head cartridge 601 mounted thereon in synchronism with image data in order to record the image data on appropriate positions on the recording sheet. The image data and the motor driving data are transmitted to the head cartridge 601 and the driving motor 602 through the head driver 307 and motor driver 305, respectively. These are driven respectively at controlled timing for the formation of images.

For the recording medium 150 which is used for a recording apparatus of the kind for the adhesion of liquid, such as ink, thereon, it is possible to use, as an objective medium, various kinds of paper and OHP sheets; plastic materials used for a compact disc, ornamental board, and the like; cloths; metallic materials, such as aluminum, copper; leather materials, such as cowhide, pigskin, and artificial leathers; wood materials, such as wood, plywood; bamboo materials; ceramic materials, such as tiles; and three-dimensional structure, such as sponge, among some others.

Also, as the recording apparatus hereof, the followings are included: a printing apparatus for recording on various kinds of paper, OHP sheet, and the like; a recording apparatus for use of plastic materials which records on a compact disc, and other plastic materials; a recording apparatus for use of metallic materials that records on metallic plates; a recording apparatus for use of leather materials that records on leathers; a recording apparatus for use of wood materials that records on woods; a recording apparatus for use of ceramics that records on ceramic materials; and a recording apparatus for recording a three-dimensional netting structures, such as sponge, or a textile printing apparatus or the like that records on cloths.

Also, as discharging liquid usable for any one of these liquid discharge apparatuses, it should be good enough if only such liquid can be used matching with the respective recording mediums and recording conditions accordingly.

What is claimed is:

1. A method for manufacturing a liquid discharge head provided with a plurality of discharge ports for discharging liquid; a plurality of liquid flow paths, each one end thereof being communicated with each of said discharge ports, having bubble generating area for generating a bubble in liquid; means for generating a bubble to generate energy for creating said bubble to be grown; a plurality of liquid supply ports, each being arranged for each of said plurality of liquid flow paths to be communicated with a common liquid supply chamber; and movable members, each having fixed portion and movable portion supported with gap with said liquid supply port on said liquid flow path side, comprising the following steps of:

forming a first gap formation member on an element substrate having said means for generating a bubble;

forming the movable portion of said movable member on said first gap formation member and the fixing portion of said movable member on said element substrate;

forming a second gap formation member for the formation of gap between the side walls of said liquid flow path and said liquid supply port on the upper surface and sides of the movable portion of said movable member;

removing said first gap formation member, while leaving said second gap formation member intact in the state of being closely in contact with said movable member;

forming wall material at least on said second gap formation member and circumference of said movable member;

patterning said wall material to form said liquid flow path walls and said liquid supply ports altogether; and removing said second gap formation member.

2. A method for manufacturing a liquid discharge head according to claim 1, further comprising the following step of:

bonding said element substrate having said means for generating a bubble, said movable member, said liquid flow path walls, and said liquid supply ports, and a ceiling plate having said common liquid supply chamber.

3. A method for manufacturing a liquid discharge head according to claim 1, wherein said step of forming said second gap formation member comprises the following steps of:

forming a second gap formation layer for forming a second gap formation member to cover said movable member;

forming a mask layer on said second gap formation layer to form the second gap formation member;

etching said second gap formation layer with dry etching process using said mask layer; and forming said second gap formation member by etching said second gap formation layer with wet etching process subsequent to said dry etching process.

4. A method for manufacturing a liquid discharge head according to claim 3, wherein said step of removing said first gap formation member is a step of removing altogether said first gap formation member, and the mask layer for forming said second gap formation member with wet etching process.

5. A method for manufacturing a liquid discharge head according to claim 2, wherein said step of forming said mask layer is a step of forming a mask layer with one and the same material as the film used for said first gap formation member.

6. A method for manufacturing a liquid discharge head according to claim 5, wherein said step of removing said first gap formation member is a step of removing altogether said first gap formation member, and the mask layer for forming said gap formation member with wet etching process.

7. A method for manufacturing a liquid discharge head according to claim 1, wherein the material of said first gap formation member is aluminum, Al/Cu, Al/Si, or other aluminum alloy, and the material of said second gap formation member is TiW, W/Si, W, or other tungsten alloy.

8. A method for manufacturing a liquid discharge head according to claim 1, wherein said liquid flow path walls and said liquid supply ports are formed by photolithographic process using negative type resist in said step of patterning wall material.

9. A method for manufacturing a liquid discharge head according to claim 8, wherein the mask pattern used in the exposure step for said liquid flow path walls and said liquid supply ports has a wider projection area of non-photosensitive portion than the projection area of said second gap formation member on said movable member in said step of patterning wall material.

10. A method for manufacturing a liquid discharge head provided with a plurality of discharge ports for discharging liquid; a plurality of liquid flow paths, each one end thereof being communicated with each of said discharge ports, having bubble generating area for generating a bubble in liquid; means for generating a bubble to generate energy for creating said bubble to be grown; a plurality of liquid supply ports, each being arranged for each of said plurality of liquid flow paths to be communicated with a common liquid supply chamber; and movable members, each having fixed portion and movable portion supported with gap with said liquid supply port on said liquid flow path side, comprising the following steps of:

forming a first gap formation layer on an element substrate having said means for generating a bubble for the formation of a first gap formation member, and performing patterning;

forming the fixing portion of said movable member having the same height as that of said first gap formation member in the portion on said substrate not occupied by said first gap formation member;

forming said movable portion of said movable member on said first gap formation member and said fixing portion of said movable member;

forming a second gap formation member for the formation of gap between the side walls of said liquid flow path and said liquid supply port on the upper surface and sides of the movable portion of said movable member;

removing said first gap formation member, while leaving said second gap formation member intact in the state of being closely in contact with said movable member;

forming wall material at least on said second gap formation member and circumference of said movable member;

patterning said wall material to form said liquid flow path walls and said liquid supply ports altogether; and removing said second gap formation member.

11. A method for manufacturing a liquid discharge head according to claim 10, further comprising the following step of:

bonding said element substrate having said means for generating a bubble, said movable member, said liquid flow path walls, and said liquid supply ports, and a ceiling plate having said common liquid supply chamber.

12. A method for manufacturing a liquid discharge head according to claim 10, wherein said step of forming said second gap formation member comprises the following steps of:

forming a second gap formation layer for forming a second gap formation member to cover said movable member;

forming a mask layer on said second gap formation layer to form the second gap formation member;

etching said second gap formation layer with dry etching process using said mask layer; and forming said second gap formation member by etching said second gap formation layer with wet etching process subsequent to said dry etching process.

13. A method for manufacturing a liquid discharge head according to claim 12, wherein said step of removing said first gap formation member is a step of removing altogether said first gap formation member, and the mask layer for forming said second gap formation member with wet etching process.

14. A method for manufacturing a liquid discharge head according to claim 12, wherein said step of forming said mask layer is a step of forming a mask layer with one and the same material as the film used for said first gap formation member.

15. A method for manufacturing a liquid discharge head according to claim 14, wherein said step of removing said first gap formation member is a step of removing altogether said first gap formation member, and the mask layer for forming said gap formation member with wet etching process.

16. A method for manufacturing a liquid discharge head according to claim 10, wherein the material of said first gap formation member is aluminum, Al/Cu, Al/Si, or other aluminum alloy, and the material of said second gap formation member is TiW, W/Si, W, or other tungsten alloy.

17. A method for manufacturing a liquid discharge head according to claim 10, wherein said liquid flow path walls and said liquid supply ports are formed by photolithographic process using negative type resist in said step of patterning wall material.

18. A method for manufacturing a liquid discharge head according to claim 17, wherein the mask pattern used in the exposure step for said liquid flow path walls and said liquid supply ports has a wider projection area of non-photosensitive portion than the projection area of said second gap formation member on said movable member in said step of patterning wall material.

* * * * *

UNITED STATES PATENT AND TRADEMARK OFFICE

CERTIFICATE OF CORRECTION

PATENT NO. : 6,521,137 B2
DATED : February 18, 2003
INVENTOR(S) : Masahiko Kubota et al.

It is certified that error appears in the above-identified patent and that said Letters Patent is hereby corrected as shown below:

Title page,
Item [56], FOREIGN PATENT DOCUMENTS,
"6-31918 2" should read -- 6-31918 --;
"9-48127 3" should read -- 9-48127 --;
"9-323405" should read -- 9-323420 --; and
"10-245884" should read -- 10-24588 --.

Column 1,
Line 43, "in" should read -- with --; and "noises." should read -- noise. --.

Column 3,
Line 39, "studies" should read -- studies --.

Column 6,
Line 52, "viscose" should read -- viscous --.

Column 7,
Line 18, "breaking" should be deleted.

Column 11,
Line 43, "brings" should be deleted; and
Line 54, "grows" should read -- growth --.

Column 16,
Line 12, "get" should read -- gate --.

Column 18,
Line 44, "into" should be deleted.

Column 21,
Line 35, "in tack" should read -- intact --.

Column 22,
Line 16, "into" should be deleted.

UNITED STATES PATENT AND TRADEMARK OFFICE

CERTIFICATE OF CORRECTION

PATENT NO. : 6,521,137 B2 
DATED : February 18, 2003
INVENTOR(S) : Masahiko Kubota et al.

It is certified that error appears in the above-identified patent and that said Letters Patent is hereby corrected as shown below:

Column 24,
Line 65 "poly-imide" should read -- polyimide --.

Column 25,
Line 61, "halfniumboride" should read -- hafnium boride --.

Column 29,
Line 9, "a" should be deleted.

Signed and Sealed this

Sixteenth Day of December, 2003

JAMES E. ROGAN
*Director of the United States Patent and Trademark Office*